(12) United States Patent
Spitaels et al.

(10) Patent No.: US 8,503,149 B2
(45) Date of Patent: Aug. 6, 2013

(54) APPARATUS AND METHOD FOR SCALABLE POWER DISTRIBUTION

(75) Inventors: James Spitaels, Worcester, MA (US); William Ziegler, Reading, MA (US)

(73) Assignee: Schneider Electric IT Corporation, West Kingston, RI (US)

(*) Notice: Subject to any disclaimer, the term of this patent is extended or adjusted under 35 U.S.C. 154(b) by 0 days.

(21) Appl. No.: 13/103,214

(22) Filed: May 9, 2011

(65) Prior Publication Data
US 2012/0087051 A1   Apr. 12, 2012

Related U.S. Application Data

(63) Continuation of application No. 12/571,486, filed on Oct. 1, 2009, now Pat. No. 7,940,504, which is a continuation of application No. 11/766,504, filed on Jun. 21, 2007, now Pat. No. 7,619,868.

(51) Int. Cl.
*H02H 3/00* (2006.01)

(52) U.S. Cl.
USPC ............................................ 361/115; 361/42

(58) Field of Classification Search
USPC .................................................. 361/42, 115
See application file for complete search history.

(56) References Cited

U.S. PATENT DOCUMENTS

| | | | |
|---|---|---|---|
| 2,860,742 A | 11/1958 | Waters, Sr. et al. | |
| 3,968,322 A | 7/1976 | Taylor | |
| 4,139,252 A | 2/1979 | Gorny | |
| 4,158,754 A | 6/1979 | Yonezaki et al. | |
| 4,218,108 A | 8/1980 | El Mouchi | |
| 4,320,261 A | 3/1982 | Scerbo et al. | |
| 4,366,390 A | 12/1982 | Rathmann | |
| 4,497,411 A | 2/1985 | DeBortoli | |
| 4,608,499 A | 8/1986 | Rathmann | |
| 4,611,289 A | 9/1986 | Coppola | |
| 4,641,225 A | 2/1987 | Reichle | |
| 4,656,767 A | 4/1987 | Tarrant | |
| 4,674,031 A | 6/1987 | Siska, Jr. | |
| 4,769,555 A | 9/1988 | Pequet et al. | |
| 4,860,168 A | 8/1989 | Wiljanen et al. | |
| 4,919,625 A | 4/1990 | Coutre | |
| 4,970,623 A | 11/1990 | Pintar | |
| 5,071,367 A | 12/1991 | Luu | |
| 5,094,626 A | 3/1992 | Fabrizi et al. | |
| 5,184,025 A | 2/1993 | McCurry et al. | |
| 5,260,864 A | 11/1993 | Simonelli et al. | |
| 5,274,808 A | 12/1993 | Miyao et al. | |
| 5,291,383 A | 3/1994 | Oughton | |
| 5,384,792 A | 1/1995 | Hirachi | |

(Continued)

FOREIGN PATENT DOCUMENTS

| | | |
|---|---|---|
| DE | 103 07 353 A1 | 11/2003 |
| DE | 20 2006 015827 U1 | 12/2006 |
| FR | 2 423 898 A1 | 11/1979 |

*Primary Examiner* — Danny Nguyen
(74) *Attorney, Agent, or Firm* — Lando & Anastasi, LLP

(57) ABSTRACT

According to one aspect of the invention, a plug-in module is provided for installing in a power distribution assembly. In one embodiment, the plug-in module may include an overcurrent protection device, a power cable, which may include a first end coupled to the overcurrent protection device, and a second end coupled to the first end, one or more receptacle outlets attached to the second end and electrical contacts coupled to the overcurrent protection device and configured to couple the plug-in module to a plurality of stationary electrical conductors of the power distribution assembly.

19 Claims, 15 Drawing Sheets

U.S. PATENT DOCUMENTS

| | | | |
|---|---|---|---|
| 5,424,903 | A | 6/1995 | Schreiber |
| 5,450,272 | A | 9/1995 | Van Gaal et al. |
| 5,457,600 | A | 10/1995 | Campbell et al. |
| 5,534,734 | A | 7/1996 | Pugh et al. |
| 5,596,479 | A | 1/1997 | Campbell et al. |
| 5,639,048 | A | 6/1997 | Bartholomew et al. |
| 5,675,194 | A | 10/1997 | Domigan |
| 5,677,831 | A | 10/1997 | Lin |
| 5,686,768 | A | 11/1997 | Thomsen et al. |
| 5,694,312 | A | 12/1997 | Brand et al. |
| 5,721,934 | A | 2/1998 | Scheurich |
| 5,764,503 | A | 6/1998 | Brand et al. |
| 5,784,628 | A | 7/1998 | Reneris |
| 5,901,067 | A | 5/1999 | Kao et al. |
| 5,923,103 | A | 7/1999 | Pulizzi et al. |
| 5,949,974 | A | 9/1999 | Ewing et al. |
| 5,969,292 | A | 10/1999 | Snider, Jr. et al. |
| 5,982,652 | A | 11/1999 | Simonelli et al. |
| 5,998,732 | A | 12/1999 | Caveney et al. |
| 6,002,563 | A | 12/1999 | Esakoff et al. |
| 6,049,143 | A * | 4/2000 | Simpson et al. ............. 307/126 |
| 6,122,155 | A | 9/2000 | Aromin et al. |
| 6,129,316 | A | 10/2000 | Bauer |
| 6,201,319 | B1 | 3/2001 | Simonelli et al. |
| 6,215,064 | B1 | 4/2001 | Noble et al. |
| 6,219,795 | B1 | 4/2001 | Klein |
| 6,301,095 | B1 | 10/2001 | Laughlin et al. |
| 6,310,783 | B1 | 10/2001 | Winch et al. |
| 6,329,616 | B1 | 12/2001 | Lee |
| 6,365,830 | B1 | 4/2002 | Snider, Jr. et al. |
| 6,373,721 | B2 | 4/2002 | Lecinski et al. |
| 6,411,506 | B1 | 6/2002 | Hipp et al. |
| 6,431,501 | B1 | 8/2002 | Molek |
| 6,437,243 | B1 | 8/2002 | VanderVelde et al. |
| 6,445,088 | B1 | 9/2002 | Spitaels et al. |
| 6,486,407 | B1 * | 11/2002 | Hawker et al. ............. 174/149 B |
| 6,541,704 | B1 | 4/2003 | Levenson et al. |
| 6,541,705 | B1 | 4/2003 | McGrath |
| 6,560,084 | B1 | 5/2003 | Bilac et al. |
| 6,586,673 | B1 | 7/2003 | Socarras |
| 6,603,073 | B2 | 8/2003 | Ferris |
| 6,651,362 | B2 | 11/2003 | Caveney |
| 6,721,672 | B2 | 4/2004 | Spitaels et al. |
| 6,741,442 | B1 | 5/2004 | McNally et al. |
| 6,834,765 | B1 | 12/2004 | Leitl |
| 6,897,747 | B2 | 5/2005 | Brandon et al. |
| 6,967,283 | B2 | 11/2005 | Rasmussen et al. |
| 6,992,247 | B2 | 1/2006 | Rasmussen et al. |
| 7,196,885 | B2 | 3/2007 | Pierce et al. |
| 7,312,980 | B2 * | 12/2007 | Ewing et al. ................. 361/622 |
| 7,358,439 | B2 | 4/2008 | Rasmussen et al. |
| 7,425,682 | B2 | 9/2008 | Rasmussen et al. |
| 7,619,868 | B2 * | 11/2009 | Spitaels et al. ............... 361/115 |
| 7,982,335 | B2 | 7/2011 | Aldag et al. |
| 2001/0003206 | A1 | 6/2001 | Pole et al. |
| 2002/0007464 | A1 | 1/2002 | Fung |
| 2002/0024332 | A1 | 2/2002 | Gardner |
| 2002/0116139 | A1 | 8/2002 | Przydatek et al. |
| 2002/0133728 | A1 | 9/2002 | Agarwal |
| 2002/0134567 | A1 | 9/2002 | Rasmussen et al. |
| 2002/0178387 | A1 | 11/2002 | Theron |
| 2002/0189848 | A1 | 12/2002 | Hawker et al. |
| 2002/0194517 | A1 | 12/2002 | Cohen et al. |
| 2003/0005339 | A1 | 1/2003 | Cohen et al. |
| 2003/0009705 | A1 | 1/2003 | Thelander et al. |
| 2003/0223234 | A1 | 12/2003 | Tang |
| 2004/0231875 | A1 | 11/2004 | Rasmussen et al. |
| 2005/0243485 | A1 * | 11/2005 | Gershen et al. ................. 361/42 |
| 2007/0291433 | A1 | 12/2007 | Ziegler et al. |
| 2010/0041277 | A1 | 2/2010 | Huber et al. |

* cited by examiner

APPARATUS AND METHOD FOR SCALABLE POWER DISTRIBUTION

RELATED APPLICATIONS

The present application is a continuation of and also claims priority under 35 U.S.C. §120 to co-pending U.S. patent application Ser. No. 11/766,504, filed Jun. 21, 2007, entitled APPARATUS AND METHOD FOR SCALABLE POWER DISTRIBUTION which is incorporated herein by reference in its entirety.

BACKGROUND OF INVENTION

1. Field of Invention

Embodiments of the invention relate generally to electrical power distribution equipment. More specifically, at least one embodiment relates to an apparatus and a method for scalable power distribution.

2. Discussion of Related Art

Centralized data centers for computer, communications and other electronic equipment have been in use for a number of years. More recently, with the increasing use of the Internet, large scale data centers that provide hosting services for Internet service providers ("ISPs"), application service providers ("ASPs") and Internet content providers are becoming increasingly popular. Typical centralized data centers contain numerous racks of equipment that require power, cooling and connections to communication facilities.

In general, centralized data centers have a power distribution system configured to avoid power outages because the data centers include a high percentage of critical loads without which an enterprise may be unable to operate. Often, an uninterruptible power supply ("UPS") is employed in the power distribution system to ensure that equipment receives continuous power and avoids any power outages. Typical power distribution systems include racks of equipment, for example, servers and the like that are located in the data center. Generally, a plurality of power distribution circuits are provided where each circuit supplies power to one or more electrical loads (e.g., servers, cooling systems, lighting circuits, etc.) via a circuit breaker. These systems generally include racks in which the circuit breakers are installed (i.e., power distribution units) or alternatively racks that include an electrical panel board which is in general similar in design to the panel boards that are found in ordinary commercial facilities.

Problems with these approaches include the fact that the installation or removal of a circuit breaker from the panel board or power distribution unit requires that a skilled individual (i.e., an electrician) perform the installation or removal in close proximity to energized electrical circuits which may include exposed electrical connections and/or conductors. Alternatively, the power distribution equipment can be de-energized to facilitate the installation or removal of one or more circuit breakers. Of course, given the critical nature of the electrical load in the data centers, even these scheduled outages are undesirable.

Some existing approaches attempt to minimize power interruptions resulting from the connection of new power distribution circuits by providing pre-fabricated plug-in power cables whereby a first end of the cable includes a connector that can be plugged into an output of a circuit breaker at the power distribution unit and a second end that can be connected to an electrical load. Although this approach may allow an electrical load to be safely connected to the circuit breaker without de-energizing the entire power distribution unit (e.g., connected with the panel board energized but without requiring any "hot work"), it requires that the cable lengths be pre-determined. In addition, such systems may not be scalable, that is, each panel board or other power distribution unit may not be configured for the correct size or quantity of circuits and corresponding circuit breakers.

As one alternative, some current systems allow a user to order a preconfigured power distribution unit that includes a main breaker with a fixed rating and a plurality of branch circuit breakers each with a pre-selected current rating. Given the dynamic nature of the electrical load that may be included in the data center, for example, the addition of one or more computers, servers, chillers, etc., the preceding approach does not provide an advantage except in the rare instance where the power distribution unit supplies a known, fixed electrical load. That is, the preceding approach is only effective where the designer and/or user of the distribution system can accurately identify the electrical loading and power distribution requirements of the facility at the time of installation. Generally, it is unrealistic to expect that the designer and/or user will accurately predict the electrical loading (e.g., the quantity of distribution circuits and their maximum loading) given the dynamic nature of facility design, power distribution systems and the connected electrical load. As a result, preconfigured power distributions are often specified with substantial excess capacity that is never used.

SUMMARY OF INVENTION

In one or more embodiments, the invention provides a modular, scalable power distribution system that provides plug-in modules that may be safely installed and removed without disrupting other electrical circuits connected to the power distribution unit. As a result, in some embodiments, the invention provides for a scalable power distribution apparatus that provides flexibility to meet the changing electrical needs of a facility such as a data center. In still other embodiments, the invention provides a system with a limited set of components that may be universally applied to a wide variety of applications.

According to one aspect of the invention, a plug-in module is provided for installation in a power distribution assembly. In one embodiment, the plug-in module includes a housing, an electrical isolation and overcurrent protection device located in the housing and a current sensing device located in the housing and adapted to sense a current carried by the electrical isolation and overcurrent protection device. The plug-in module may further include a power cable including a first end that is pre-terminated at the plug-in module to connect the power cable to the electrical isolation and overcurrent protection device, and electrical contacts adapted to removably couple the plug-in module to a plurality of stationary electrical conductors of the power distribution assembly. According to one embodiment, the electrical isolation and overcurrent protection device includes a circuit breaker. In a further embodiment, the power cable is pre-terminated inside the housing. In yet another embodiment, the circuit breaker is adapted for mounting on a DIN rail. In still another embodiment, the plug-in module includes a mechanical stress relief device for the power cable.

According to another aspect of the invention, a power distribution apparatus includes a plug-in module and a bus bar assembly. In one embodiment, the plug-in module includes a housing, a circuit breaker located in the housing, a power cable including a first end that is pre-terminated at the plug-in module to connect the cable to the circuit breaker, and electrical contacts adapted to removably couple the plug-in module to a plurality of bus bars. According to one embodiment, the bus bar includes the plurality of bus bars, an insulated rear panel, a first side panel and a second side panel where the insulated rear panel, the first side panel and the second side panel are sized and arranged to form a region adapted to receive the plug-in module. In one embodiment, the region is free of uninsulated conductors.

In accordance with one embodiment, the bus bar assembly includes at least one guide element included with at least one of the first side panel and the second side panel. In a version of this embodiment, the plug-in module includes at least one guide element sized and adapted to engage the at least one guide element of the bus bar assembly. In one embodiment, the bus bar assembly further includes a plurality of opening formed in the insulated rear panel where the openings are sized and adapted to allow insertion of the electrical contacts within the openings, and the at least one guide element is sized and adapted to engage a part of the plug-in module such that each of the electrical contacts is aligned with a corresponding one of the plurality of openings, respectively.

In accordance with another aspect, the invention provides a method of installing a power distribution system in a facility. According to one embodiment, the method includes an act of obtaining a plurality of plug-in modules where each of the plug-in modules includes a housing containing the circuit breaker. In addition, in one embodiment, the plug-in module includes a power cable having a first end electrically coupled to the circuit breaker, and electrical contacts coupled to the circuit breaker. The method further includes an act of installing at least some of the plurality of plug-in modules in a power distribution assembly by sliding the plug-in modules into the power distribution assembly such that the electrical contacts of each of the plug-in modules are electrically coupled to electrical conductors in the power distribution assembly.

According to one aspect of the invention, a plug-in module is provided for installing in a power distribution assembly. In one embodiment, the plug-in module may include an electrical isolation and overcurrent protection device, a power cable, which may include a first end coupled to the electrical isolation and overcurrent protection device, and a second end coupled to the first end, one or more receptacle outlets attached to the second end and electrical contacts arranged and configured to couple the plug-in module to a plurality of stationary electrical conductors of the power distribution assembly.

In accordance with another aspect, the invention provides a method of installing a power distribution system in a facility. In one embodiment, the method may include acts of obtaining a plurality of plug-in modules, each of the plug-in modules having a circuit breaker, a power cable having a first end electrically coupled to the circuit breaker, a second end electrically coupled to the first end, at least one receptacle outlet attached to the second end and electrical contacts coupled to the circuit breaker and installing at least some of the plurality of plug-in modules in a power distribution assembly by sliding the plug-in modules into the power distribution assembly such that the electrical contacts of each of the plug-in modules are electrically coupled to electrical conductors in the power distribution assembly.

BRIEF DESCRIPTION OF DRAWINGS

The accompanying drawings, are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
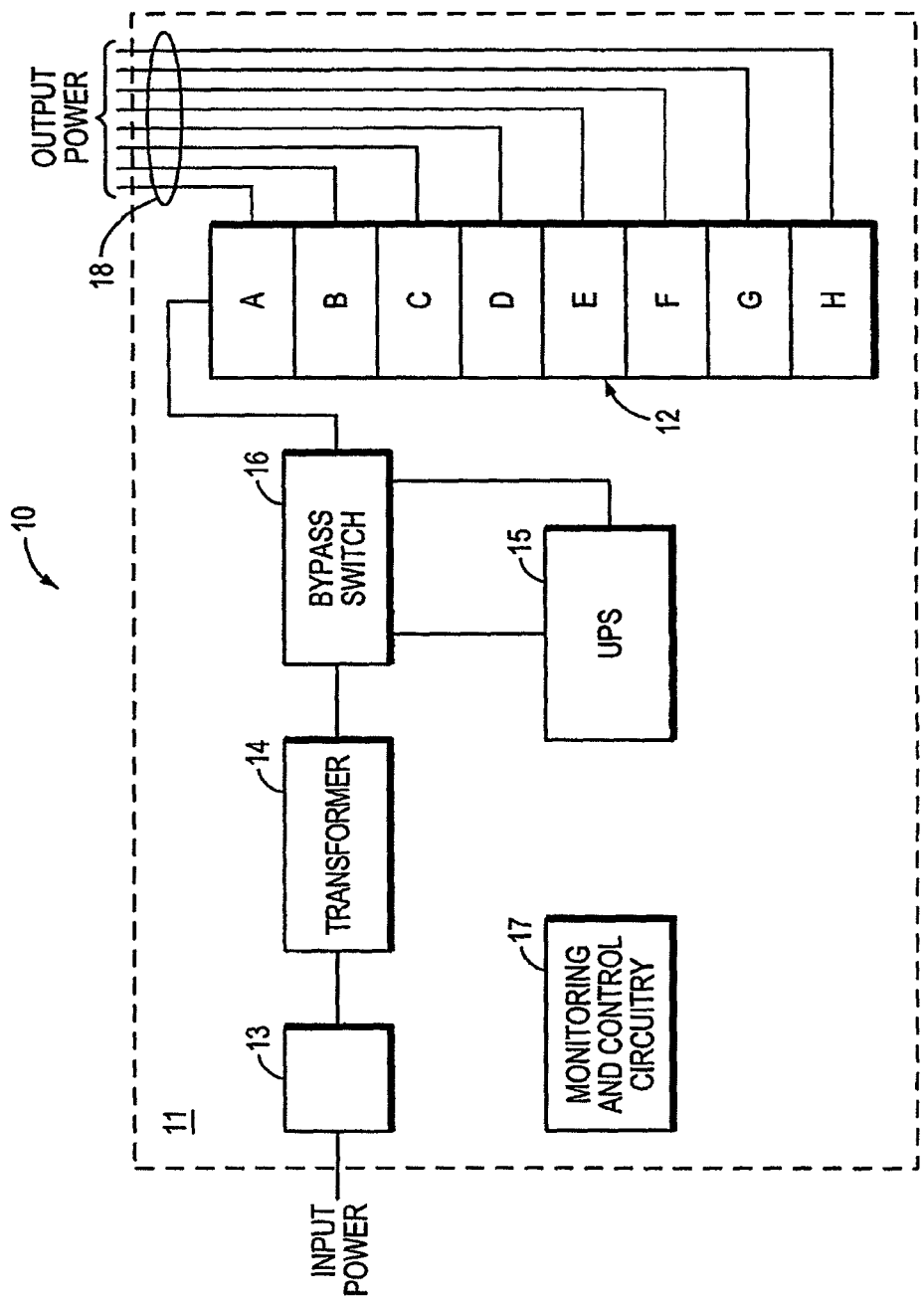
FIG. 1 illustrates a block diagram of an electrical system in which scalable power distribution equipment is employed in accordance with one embodiment of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

FIG. 1 illustrates a power distribution system 10 in accordance with one embodiment, where the system includes a power distribution unit 11 ("PDU") that provides a plurality of output circuits 18 (e.g., branch circuits) to supply electrical power to a plurality of electrical loads, for example, loads found in a data center or another type of facility. The power distribution system 10 may include an input circuit breaker 13, a transformer 14, an uninterruptible power supply ("UPS") 15, a bypass switch 16, a bus bar assembly 12 and monitoring and control circuitry 17. In various embodiments, the PDU 11 includes the bus bar assembly 12 while each of the remaining apparatus listed in the preceding sentence may either be included in the PDU 11, or optionally, be physically located elsewhere in the power distribution system 10.

According to one embodiment, the PDU 11 includes the bus bar assembly 12 and each of the input circuit breaker 13, the transformer 14, the UPS 15, the bypass switch 16 and the monitoring and control circuitry 17, as illustrated in FIG. 1. In another embodiment, each of the input circuit breaker 13, the transformer 14, the UPS 15, the bypass switch 16 and at least a part of the monitoring and control circuitry 17 are located external to the PDU 11. In other embodiments, various combinations of the input circuit breaker 13, the transformer 14, the UPS 15, the bypass switch 16 and the monitoring and control circuitry 17 are co-located with the bus bar assembly 12 in the PDU 11. Thus, in one embodiment, the bus bar assembly 12, the input circuit breaker 13, the transformer 14, the bypass switch 16 and at least a part of the monitoring and control circuitry 17 are located in the PDU 11 while the UPS is located external to the unit 11. In yet another embodiment, the power distribution system 10 does not include a UPS. As a result, in one embodiment, the PDU 11 includes the bus bar assembly 12 and each of the input circuit breaker 13, the transformer 14, and at least a part of the monitoring and control circuitry 17, while the UPS 15 and the bypass switch 16 are not employed with the PDU 11.

According to one embodiment, the PDU 11 is contained within an equipment rack that allows the "rack mounting" of the bus bar assembly 12 and others of the apparatus included within it. In a version of this embodiment, the PDU 11 is included in a row of equipment racks that may be coupled to one another as is well known to those of ordinary skill in the art. As a result, in some embodiments, the PDU 11 includes the bus bar assembly 12, while one or more other equipment racks include others of the input circuit breaker 13, the transformer 14, the UPS 15, the bypass switch 16 and the monitoring and control circuitry 17. In versions of these embodiments, the equipment racks including the apparatus identified here are coupled together to form a row of equipment racks employed in the power distribution system 10, for example, as described in commonly assigned U.S. Pat. No. 6,967,283, entitled "Adjustable Scalable Rack Power System and Method," issued Nov. 22, 2005 to Neil Rasmussen et al. which is incorporated by reference herein. The above-described configurations describe only some of the possible configurations and are not intended to be limiting.

In accordance with one embodiment, the bus bar assembly 12 is adapted to receive at least one plug-in module that may include a switching device and overcurrent protection (e.g., an electrical isolation and overcurrent protection device), for example, a circuit breaker, a fused switch, or a separate switch and one or more fuses. In one embodiment, the plug-in module is installed in the bus bar assembly 12 to connect the bus bar assembly to the output circuits. As is described in greater detail below, in various embodiments, the plug-in module may include a pre-terminated power cable to facilitate a safe connection of new output circuits with the PDU 11 and the bus bar assembly energized. Further, in various embodiments, the bus bar assembly 12 provides a region free of uninsulated conductors in which the plug-in module is installed.

In one embodiment, the bus bar assembly 12 includes a plurality of positions A-H that are each adapted to receive a plug-in module. In a version of this embodiment, the bus bar assembly is rated for a maximum continuous current of 400 Amps while each position A-H is rated for a maximum continuous current of 100 Amps. In one embodiment, each of the plug-in modules is also rated for 100 Amps although various ampacity circuit breakers may be included in the plug-in modules, e.g., having ampacities of from less than 1 Amp up to and including a maximum of 100 Amps. Such an approach may, in various embodiments, provide a scalable system that can employ two elements (i.e., a bus bar assembly and plug-in modules) to meet a wide variety of the existing and future electrical needs of a facility. This results in efficiencies in manufacturing, supply chain and operation and maintenance for the equipment. For example, a manufacturer need not manufacture and a designer need not try to select from a plurality of semi-custom equipment. Accordingly, the equipment may have a lower cost and greater availability.

As illustrated in FIG. 1, a source of input power is connected to the line side of the input circuit breaker 13, the load side of the input circuit breaker 13 is connected to a line side (i.e., the input) of the transformer 14, the load side (i.e., the output) of the transformer 14 is connected to the input of the bypass switch 16, and the output of the bypass switch 16 is connected to the bus bar assembly 12. In one embodiment, both the input and the output of the UPS 15 are connected to the bypass switch 16. As is well known by those of ordinary skill in the art, the bypass switch 16 operates to selectively connect the output of the bypass switch 16 to either the transformer 14 or the UPS 15. In accordance with one embodiment, the bus bar assembly 12 receives the power from the bypass switch 16 and supplies power to one or more output circuits 18. In one embodiment, the bypass switch is adapted to selectively couple the output of the transformer 14 and the output of the UPS 15 to the bus bar assembly 12.

The monitoring and control circuitry 17 may perform solely monitoring functions, solely control functions or a combination of monitoring and control. In various embodiments, monitoring includes any one or any combination of the following functions and/or the following functions and additional functions: current sensing, power monitoring (e.g., energy consumption), circuit on/off sensing, bypass switch status, UPS status and the like. Any of the preceding may be accompanied by signal processing employed for the purpose of monitoring and/or control. For example, current and voltage signals may be processed to determine energy consumption. Accordingly, the monitoring and control circuitry 17 may include one or more processors, e.g., microprocessors.

In addition, the monitoring and control circuitry 17 may include communications with any of the various components included in the PDU 11. Accordingly, in some embodiments, the PDU includes circuitry (not shown) that connects the monitoring and control circuitry 17 to one or more of the bus bar assembly 12, input circuit breaker 13, the transformer 14, the UPS 15, and the bypass switch 16. Further, in various embodiments, the monitoring and control circuitry 17 may be included in or communicate with a local area network and or a wide area network (e.g., the Internet).

In further embodiments, control functions include any one or any combination of the following functions and/or the following functions and/or additional functions: control of UPS operation, control of bypass switch operation, operation of one or more circuit breakers, other switching operations and the like. Accordingly, the monitoring and control circuitry 17 may include a user interface such as a display and/or switches, meters, indicating lights, and the like.

Figure 2:
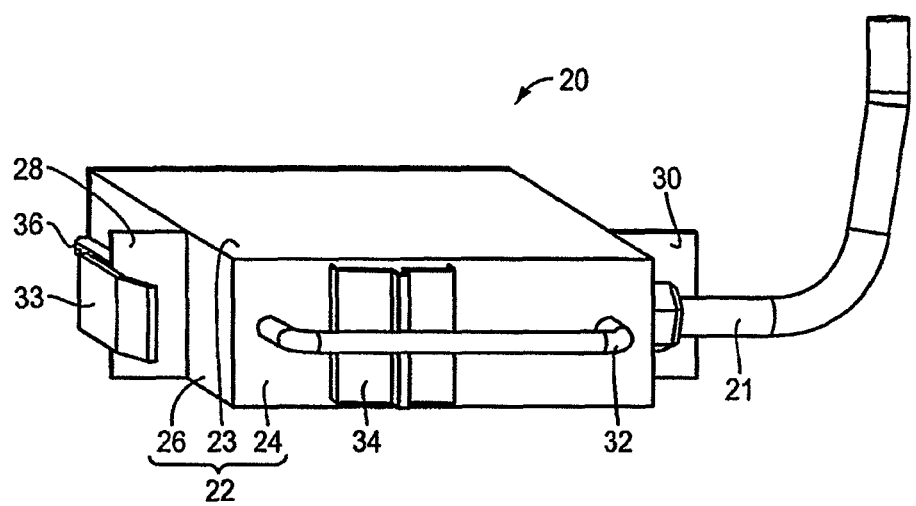
FIG. 2 illustrates an isometric view of a plug-in module in accordance with one embodiment of the invention.

Referring now to FIG. 2, an isometric view of a plug-in module 20 in accordance with one embodiment of the invention is illustrated. In general, the plug-in module 20 is employed to supply power from the PDU 11 to an electrical load. Further, in accordance with various embodiments of the invention, the plug-in module 20 includes a switching device such that a line-side of the plug-in module connects to a source of electrical power and a load side of the plug-in module 20 can be directly connected to an electrical load or connected to further circuitry that is connected to the electrical load. Thus, in one embodiment, the plug-in module 20 includes a circuit breaker that can provide electrical isolation and overcurrent protection (e.g., a miniature molded case circuit breaker that senses overloads and/or short circuits). In other embodiments, the plug-in module includes a combination of an isolation switch and fusing such as a fused disconnect switch or a combination of a switch and fuses that are separate from one another. In accordance with one embodiment, the plug-in module is sized and adapted for installation in a bus bar assembly, for example, the bus bar assembly 42 illustrated in FIG. 5. In various embodiments, the plug-in module 20 includes a power cable 21 which may include an end that is pre-terminated at the plug-in module 20.

As used herein, the term "pre-termination" refers to the fact that a first end of the power cable 21 is connected at the plug-in module 20 before the plug-in module arrives on a job site. According to one embodiment, the pre-termination is performed during the manufacture of the plug-in module 20.

In some embodiments, the length of the power cable 21 is also established during manufacture. That is, in one embodiment, a plurality of commonly used fixed lengths of power cable 21 may be available. In a version of this embodiment, the plurality of commonly used fixed lengths are established based on a distance between a first enclosure and/or equipment rack and a second enclosure and/or equipment rack. Thus, a connection between the plug-in module 20 and an immediately adjacent equipment rack may require a shorter length of cable when compared with the length of cable required for a connection between the plug-in module 20 and a more distant equipment rack. Because equipment racks are often supplied in standard sizes the length of the power cables 21 can be determined in advance. In addition, a second end of the power cable 21 may include a connector to facilitate the connection of the power cable 21 to an electrical load.

As illustrated in FIG. 2, the plug-in module 20 includes a housing 22 having a top panel 23, a front panel 24 and a first side panel 26. In various embodiments, the plug-in module 20 may also include a bottom panel, a rear panel and a second side panel (located opposite the first) which are not illustrated in FIG. 2. The housing 22 may be manufactured using any rigid material (conductive material or insulating material) suitable for use with electrical equipment, for example, the housing may be manufactured from steel. In some embodiments, portions of the housing are conductive while other portions of the housing are insulating. According to one embodiment, a first extension 28 extends from the first side panel 26 in a substantially perpendicular direction while a second extension 30 may extend from the second side panel.

In various embodiments, the plug-in module 20 may include additional features and various combinations of features. For example, according to one embodiment, the plug-in module 20 includes a handle 32 that is attached to the housing 22 (e.g., at the front panel 24) which may be employed by a user to install and remove the plug-in module 20. In some embodiments, the plug-in module 20 includes a latch 33 that secures the plug-in module 20 in a fully installed position. In the illustrated embodiment, the latch 33 is attached to an end of the first extension 28. Alternatively, a single latch 33 may be attached to an end of the second extension 30. In yet another embodiment, a separate latch 33 may be attached to each of the first extension 28 and the second extension 30.

In addition, one or more of the housing 22 and/or extensions 28, 30 may include a rejection feature to provide an interference employed to prevent the installation of a plug-in module 20 based on one or more conditions, for example, where a nominal voltage rating of the plug-in module 20 is lower than a nominal voltage rating of equipment (e.g., the bus bar assembly) in which the plug-in module is being installed, where the plug-in module is being installed up-side down, etc.

The plug-in module 20 may also include a guide element 36 which may assist in properly aligning the plug-in module 20 when it is being installed. For example, the guide element 36 may engage a corresponding part of an enclosure/rack or bus bar assembly in which the plug-in module 20 is being installed. The guide element 36 may be an integral part of the housing or a separate component. In addition, a plurality of guide elements 36 may be employed. In one embodiment, the guide element 36 is a rail located on the side panel 26 of the housing 22. In this embodiment, the guide element 36 may engage a corresponding groove in, for example, a bus bar assembly. In a further embodiment, a separate guide element 36 is included on each of the side panels. It should be apparent to those of ordinary skill in the art that the guide element or elements 26 may include structure other than a rail, for example, a tab or an extension (such as a cylindrical extension) may be employed. Further, the guide element may be located anywhere on the plug-in module 20 that will facilitate a proper alignment of the module. It should also be apparent that the guide element 36 need not extend from the plug-in module but may instead be a groove, channel, tube, hollow or other recess that engages corresponding structure extending from the bus bar assembly, enclosure and/or rack in which the plug-in module 20 is installed.

The latch 33 may include a variety of different structure that allows the plug-in module 20 to be retained in a fully-installed position, e.g., with the plug-in module 20 fully connected to the bus bar assembly 42. For example, the latch 33 may have a range of motion such that the latch 33 deflects from an at-rest position as the plug-in module 20 is installed and then captures (or is captured by) a part of the bus bar assembly and/or rack in which it is installed. As should be apparent to one of ordinary skill in the art, the latch 33 can be manufactured from flexible material and/or rigid material configured to flex in an elastic manner when pressure is applied to the latch 33.

As mentioned above, the plug-in module 20 may include a circuit breaker 34 such that the plug-in module 20 can provide overcurrent protection for the electrical load to which it is connected, e.g., it can provide overload and short circuit protection. In one embodiment, the circuit breaker 34 is located such that at least a part of the circuit breaker is accessible with the housing 22 completely assembled. For example, the front panel 24 may include an opening through which the face of the circuit breaker 34 is accessible and/or extends. Such a configuration can allow the circuit breaker status (i.e., open, closed, tripped, etc.) to be determined and also allow operating personnel to operate the circuit breaker 34.

In one embodiment, the circuit breaker 34 is a Pro-M series miniature circuit breaker manufactured by ABB. Example part numbers for IEC rated circuit breakers include: S201-K16; S201-K32; S203-K16; and S203-K32. Example part numbers for circuit breakers designed to meet traditional U.S. standards include: S201U-K20; S203U-K32; and S203U-K50. In another embodiment, the circuit breaker 34 is a L-Series miniature circuit breaker manufactured by Altech. Examples include a Catalog No. 1CU02L rated for 0.2 Amps and single pole applications and a Catalog No. 3CU63L rated for 63 Amps and three pole applications. It should be apparent to those of ordinary skill in the art that other makes, models and configurations (e.g., four pole, six pole, etc.) can be employed. In addition, the plug-in module 20 can include a circuit breaker that complies with any applicable standard from any of a variety of standard setting bodies.

As illustrated, the power cable 21 is pre-terminated within the housing 22, however, in an alternate embodiment the power cable 21 is pre-terminated external to the housing 22. Further, where the power cable 21 is pre-terminated to the plug-in module 20, the pre-termination provides a connection between one or more of the conductors included in the power cable 21 and the circuit breaker 34. In accordance with one embodiment, the pre-termination results in the power cable 21 being directly connected to one or more terminals/lugs integral with the circuit breaker 34. However, such a direct connection is not required and various other configurations may be employed. For example, the power cable 21 may be terminated at another terminal point/lug located in the plug-in module 20. In this embodiment, a jumper or short piece of cable, wire, etc. may connect the terminal point/lug (and as a result the power cable) to the circuit breaker 21.

The plug-in module 20 may also include various control elements to provide status indications and/or allow control of, for example, the circuit breaker 34. According to one embodiment, the plug-in module 20 includes one or more status indication lights that may be located in the front panel 24 and used to indicate a circuit breaker status. In another embodiment, the plug-in module 20 may include a relay that can be employed to open the circuit breaker to disconnect the load being supplied by the plug-in module 20 as part of a load shedding scheme. In addition, the circuit breaker or other isolating means may be electrically operated such that is can be electrically opened, closed and reset. The plug-in module 20 may also include an auxiliary switch or one or more voltage sensors to determine the position of the poles of the circuit breaker, the status of switch contacts or the status of fuses.

Further, the plug-in module 20 may also include one or more temperature sensors to provide data concerning, for example, the temperature of contacts that connect the plug-in module 20 to the bus bar assembly 12, the temperature of circuit breaker and/or the temperature of the circuit breaker terminals/lugs. In some embodiments, the preceding approach may be employed to reduce or eliminate the need to perform IR scanning for over temperature conditions. In one embodiment, the preceding approach provides data that is employed to supplement IR scanning, for example, to identify areas of interest.

Figure 3:
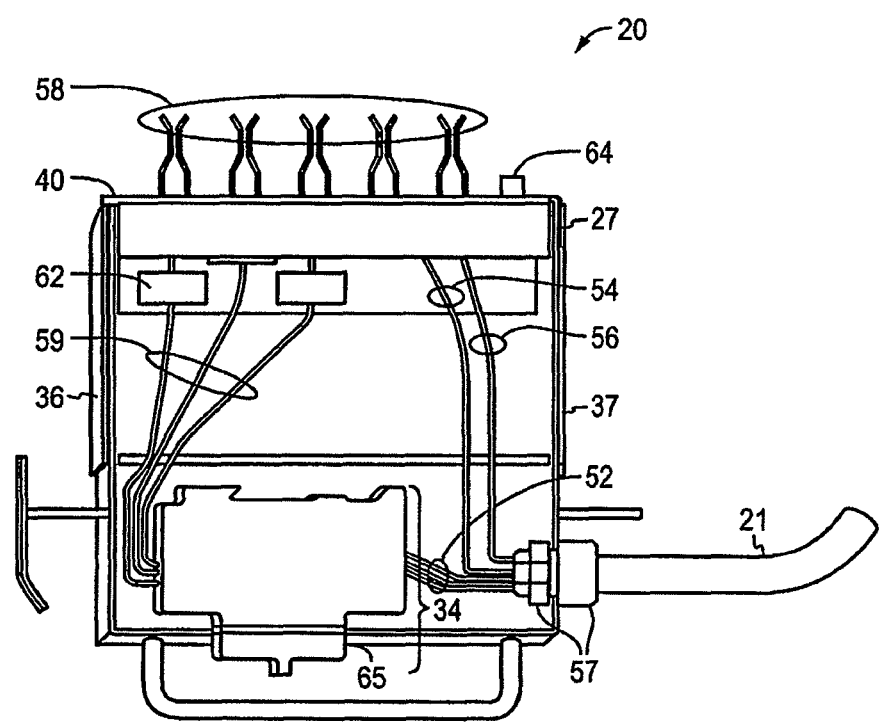
FIG. 3 illustrates a plan view of a plug-in module in accordance with one embodiment of the invention.

FIG. 3 illustrates a plan view of the plug-in module 20 of FIG. 2 with the top of the housing (e.g., a top panel) removed. A second side panel 27 and a rear panel 40 included as part of the housing 22 are illustrated in FIG. 3. In addition to the housing 22, the power cable 21 and the circuit breaker 34, e.g., a molded case circuit breaker, the plug-in module 20 includes line conductors 52, a neutral conductor 54, a ground conductor 56 and a plurality of contacts 58. In accordance with one embodiment, the power cable 21 includes each of the line conductors 52, the neutral conductor 54, and the ground conductor 56. In one embodiment, additional line conductors 59 connect the circuit breaker 34 to the contacts 58. Further, in one embodiment, each line conductor 59 is ultrasonically welded to the corresponding contact of the plurality of contacts 58. As should be apparent to those of ordinary skill in the art, other configurations of the power cable may be employed, for example, the power cable 21 may not include a neutral when the plug-in module 20 is connected to a 3-wire load. As illustrated in FIG. 3, in some embodiments, the power cable 21 may have the line conductors 52 pre-terminated at the circuit breaker while the neutral conductor 54 and the ground conductor 56 are terminated elsewhere in the plug-in module 20.

In accordance with one embodiment, the plug-in module 20 includes a mechanical stress relief device 57 for the power cable 21. That is, the plug-in module 20 includes a device to reduce any forces that may tend to pull the pre-terminated power cable 21 from the plug-in module 20. According to one embodiment, the mechanical stress relief device 57 includes an internal bushing, an external bushing, other hardware, or a combination of any of the preceding. In one embodiment, the mechanical stress relief device 57 is a type of stress relief device that is also suitable for use with twist lock cord end connectors. In a version of this embodiment, the mechanical stress relief 57 is a strain relief device provided by Hubbell Incorporated, for example, a model that is approved by Underwriter's Laboratory. According to one embodiment, the mechanical stress relief 57 is overmolded onto the power cable 21 where the power cable 21 includes three single phase power cords.

In addition, in one embodiment, the plurality of contacts 58 are located outside the housing proximate the rear panel 40. In one embodiment, each of the electrical contacts include a pair of contact "fingers" sized and adapted to engage a bus bar with a proper amount of tension to create a stable electrical connection when the plug-in module 20 is inserted in the bus bar assembly 42, e.g., the contacts provide sufficient pressure to prevent the connection with the bus bar from overheating when current is being carried by the plug-in module. As should be apparent, other configurations of the plurality of contacts 58 may be employed so long as the contacts 58 are adapted to removably engage corresponding stationary contacts and/or contact surfaces. Stationary conductors, stationary contacts and stationary contact surfaces have fixed positions that cannot be moved when the PDU is in service, i.e., when the PDU is energized. In the illustrated examples, a bus bar can be a stationary conductor that provides a stationary contact surface. In a version of this embodiment, the neutral conductor 54 and the ground conductor 56 are pre-terminated at the corresponding contacts 58, respectively. According to one embodiment, the contacts 58 are manufactured from copper with a 2-3 micron coating of nickel and a tin plating finish. In a further embodiment, contact pressure is assisted by a spring clip, for example, a spring clip manufactured from carbon steel or stainless steel.

In one embodiment, the plug-in module 20 also includes a plurality of current sensing devices 62, for example, current transformers ("CTs"). According to one embodiment, the plug-in module 20 includes a separate current sensing device 62 for each line conductor. Thus, according to one embodiment, the plug-in module 20 is employed with a three phase circuit and includes three CTs. Of course, other configurations may be used, for example, the plug-in module may also include a fourth CT for sensing neutral current. A wide variety of current sensing devices may be employed provided that they include a suitable current rating and physical dimensions that allow them to be installed within the housing 22 of the plug-in module 20. Example current sensors include: a part no. 5304 from Amecon Inc.; a part no. T75001 from Falco Electronics, LTD.; and a part no. 460-1001A from Shilcharpayton Technologies, LTD.

In accordance with one embodiment, the plug-in module 20 includes a connector 64 sized and adapted for connecting one or more secondary circuits to circuitry located external to the plug-in module 20 when the plug-in module is installed in the bus bar assembly 42. Secondary circuits can include any monitoring and/or control circuits including circuits that employ the output of the current sensors. Accordingly, the connector 64 may be employed to connect secondary circuits or portions thereof included in the plug-in module 20 to secondary circuitry included in the monitoring and control circuitry 17.

In various embodiments, the connector 64 includes at least one contact which is configured to engage a corresponding contact (not shown) included in the bus bar assembly. As should be apparent to those of ordinary skill in the art, that various styles and types of contacts may be employed provided that the contacts and connector are rated for the nominal operating voltage and nominal current of the secondary circuit or circuits. According to one embodiment, the connector 64 extends from within the housing 22 through the rear panel 40. In one embodiment, the connector 64 is adapted to mate with an edge connector included in the bus bar assembly 42. Example connectors include: a part no. 5-5530843-0 from Tyco Electronics Corp.; and a part no. 2551-20D from Ito-Chien Enterprise Co. Ltd.

In accordance with one embodiment, a part 65 of the circuit breaker 34 externally accessible (i.e., accessible outside the housing 22) is illustrated. In addition, FIG. 3 illustrates the use of the guide element 36 (i.e., a first guide element) and a second guide element 37.

Figure 4:
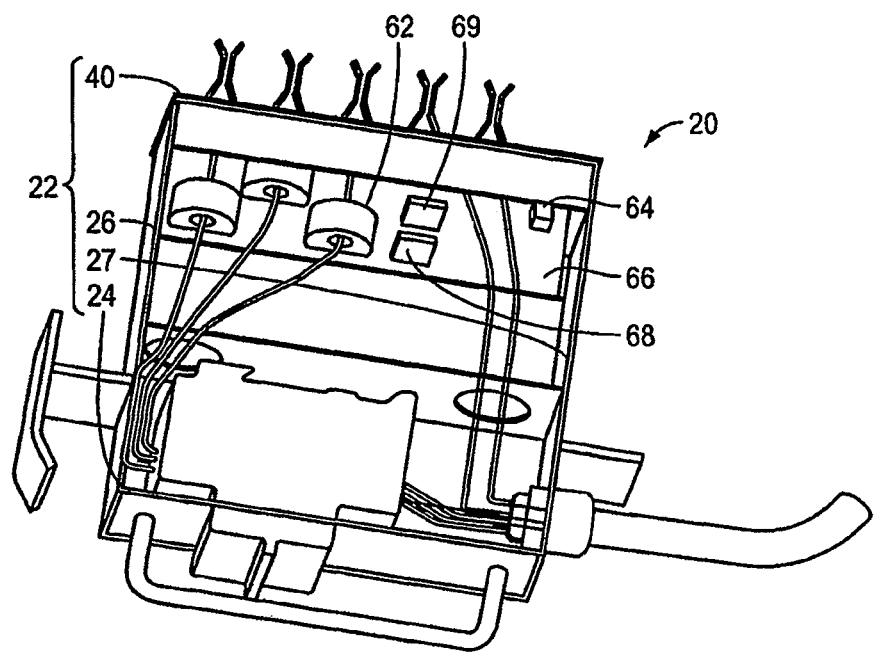
FIG. 4 illustrates an isometric view of the plug-in module of FIG. 3 in accordance with one embodiment of the invention.

Referring now to FIG. 4, an isometric view of the plug-in module of FIG. 3 is illustrated. As illustrated here, each of the three current sensors 62 is clearly shown. In accordance with one embodiment, the current sensors 62 are included on a printed circuit board ("PCB") 66 located within the housing 22. In addition, the portion of the connector 64 located within the housing 22 is illustrated. In accordance with one embodiment, the connector 64 is also coupled to the PCB 66 within the housing. In a version of this embodiment, at least some of the contacts within the connector 64 are connected to circuitry located on the PCB 66.

In some embodiments, the secondary circuitry located in the plug-in module 20 does not include a processor or any control functions, for example, the secondary circuitry may simply provide the output of the sensing devices to the connector 64. The outputs may then be communicated to the monitoring and control circuitry 17 via the connector 64 when the plug-in module is installed in the bus bar assembly 42. In alternate embodiments, the secondary circuitry includes a processor 68 (e.g., a microprocessor), for example, located on the PCB 66. In versions of these embodiments, the processor 68 may be employed to perform either monitoring, control functions or both. Further, the processor 68 can be included in the monitoring and control circuitry 17 when the plug-in module is installed in the PDU 11.

In one embodiment, the plug-in module 20 includes a memory 69 (e.g., RAM, ROM, etc.) that stores information, for example, information concerning the plug-in module 20. The information may include the ampacity of the plug-in module 20, the quantity of poles, the date of manufacture, the manufacturing facility, authenticity codes, the size of the conductors included in the power cable 21, the style of the power cable 21, the length of the power cable 21 and other information. According to one embodiment, the plug-in module 20 is programmed with the preceding information at the time of manufacture. Further, where the plug-in module 20 communicates with a communication network (for example, via the connector 64) the information can be employed to automatically set up and provide information concerning the plug-in module 20 to a power distribution monitoring system. In one embodiment, the memory 69 is included in a chip, for example, an EPROM chip.

Figure 5:
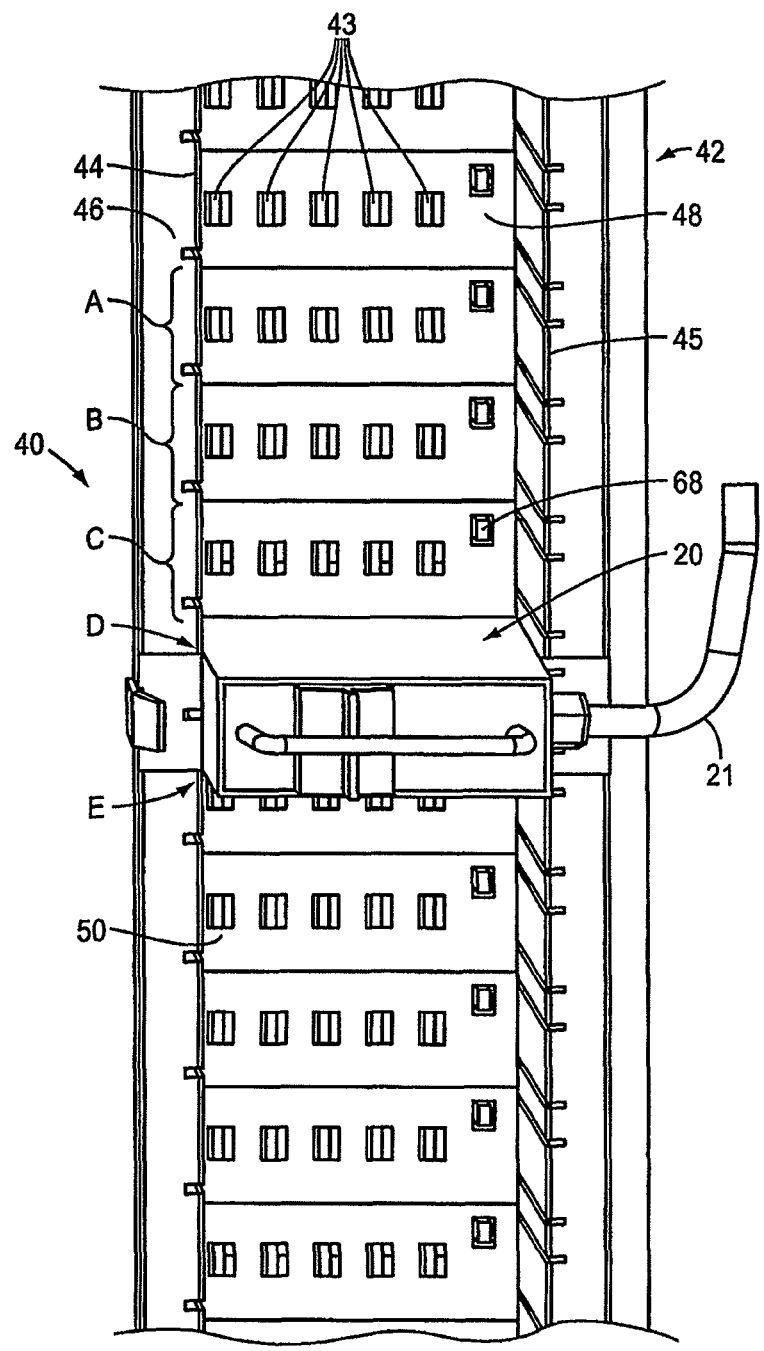
FIG. 5 illustrates a plug-in module installed in a bus bar assembly in accordance with one embodiment of the invention.

As mentioned previously, the plug-in module may be installed in a bus bar assembly, for example, the bus bar assembly 12 located in PDU 11. Referring now to FIG. 5, a system 40 is shown in which the plug-in module 20 is installed in a bus bar assembly 42 at a first position, i.e. position D. In accordance with the illustrated embodiment, the bus bar assembly includes a plurality of positions in which separate plug-in modules may be installed. In the interest of clarity, only 5 of the available positions are uniquely identified, positions A, B, C, D, and E, with position E being the position immediately below the position in which the plug-in module 20 is installed, position C being above and immediately adjacent position D and each of positions A and B being located further above position D.

In one embodiment, the bus bar assembly 42 includes a plurality of bus bars 43 and the plug-in module 20 is installed by sliding the module into the bus bar assembly 42 to engage electrical contacts 58 at the rear of the plug-in module 20 with the bus bars 43. In one embodiment, bus bar assembly includes a first side panel 44 and a second side panel 45. The side panels 44, 45 may each be a single unit, or alternatively, may each include a plurality of side panels. For example, the side panels 45, 46 may include a separate side panel for each of the plurality of positions, e.g., the positions A-E. The side panels 44, 45 may be manufactured using any rigid material (conductive material or insulating material) suitable for use with electrical equipment, for example, the side panels 44, 45 may be manufactured from steel. In another embodiment, the side panels 44, 45 are manufactured from insulating material.

Either or both of the side panels 44, 45 may include a guide element 46 that is used to properly position and guide the plug-in module 20 as it is installed. In one embodiment, the guide elements 46 are slots that are sized and adapted to engage the guide elements 36, 37 in the form of guide rails included in the plug-in module 20. As described previously with respect to the guide elements 36, a wide variety of structure may be employed to provide the guide elements 46 so long as they are sized and adapted to engage corresponding structure included in the plug-in module 20.

The bus bar assembly 42 may also include a rear panel 48 that provides an electrically insulating barrier between the region where the plug-in module(s) are located and the location of the bus bars 43. In one embodiment, the rear panel 48 is made of plastic. In accordance with one embodiment, the rear panel 48 includes a plurality of openings 50 that are sized and adapted to allow the electrical connection to be made with the plug-in module 20 but are small enough to prevent the accidental contact of a user and/or hand tools with the bus bar. Accordingly, in one embodiment, the rear panel 48 and the side panels 44, 45 form a region that is free of uninsulated conductors. As a result, the plug-in modules 20 may be safely installed and removed from the bus bar assembly 42 while the bus bars are energized. In one embodiment, the power distribution unit includes a cable guide and securing system that provide hardware for securely locating the power cables 21 for a plurality of plug-in modules 20 installed in the bus bar assembly, for example, using wire-ties. In one embodiment, the cable guide and securing system is included as part of the bus bar assembly 42.

In addition, embodiments of the bus bar assembly 42 also allow the power cable 21 to be safely routed with the bus bar energized. For example, where the bus bar assembly 42 is installed in an enclosure and/or equipment rack the separate cables 21 associated with each of a plurality of plug-in modules 20 may be safely routed within the enclosure/rack (e.g., on the front side of the bus bar assembly) while others of the plug-in modules are in service and supplying power to one or more output circuits. In one embodiment, the enclosure includes bushings and/or glands through which the power cables 21 exit the enclosure, e.g., dust-proof, weather-proof, etc. In various embodiments, the power cables 21 may exit the rack and/or enclosure via a roof or a floor. In one embodiment, a power cable 21 associated with a first plug-in module exits through the roof and a power cable 21 associated with a second plug-in module exits through the floor of the same rack and/or enclosure.

In some embodiments, the rear panel 48 includes a connector 68 that can be employed to connect the monitoring and control circuitry 17, or a portion thereof, to secondary circuitry included in the plug-in module 20.

Figure 6:
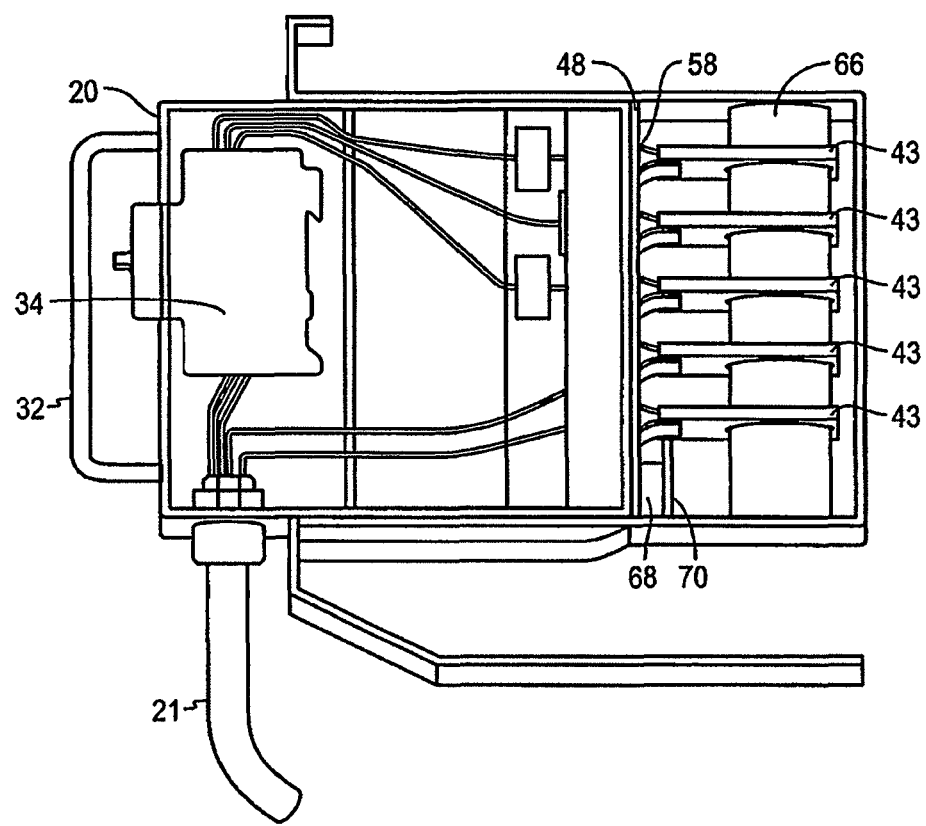
FIG. 6 illustrates a top view of a plug-in module installed in a bus bar assembly in accordance with an embodiment of the invention.

Referring now to FIG. 6, a plan view of the plug-in module 20 connected to the bus bar assembly 42 is illustrated in accordance with one embodiment. The bus bar assembly 42 includes the plurality of bus bar 43, for example, a bus bar for each of the line conductors, the neutral, and the ground. The bus bars 43 may be separated by insulators 66, for example, cylindrically shaped insulators that may be stacked between adjacent bus bar or between a bus bar and an adjacent side panel. According to one embodiment, the insulators are held in place using screws, although other fastening means may be employed. FIG. 6 also illustrates the connector included with the plug-in module 20 (e.g., the connector 64) engaged with the connector 68 included in the bus bar assembly 42. For example, in the illustrated embodiment, the connector 64 is received within the connector 68 when the plug-in module 20 is installed in the bus bar assembly 42. When the connectors 64, 68 are engaged as described here, at least one contact included in the connector 64 is coupled with at least one contact included in the connector 68. As is apparent to those of ordinary skill in the art, each of the connectors 64, 68 may include a plurality of contacts that are engaged when the plug-in module 20 is installed. Further, in the illustrated embodiment, the connector 68 is coupled to control circuitry located on a printed circuit board 70 included with the bus bar assembly 42.

FIG. 6 also illustrates the connection of the plurality of contacts 58 to the corresponding bus bar 43. That is, as the plug-in module 20 is slid into a position (e.g., one of the positions A-E) within the bus bar assembly 42, each of the contacts 58 penetrate through the corresponding opening 50 in the rear panel 48 and engage the corresponding bus bar 43. According to one embodiment, the contacts 58 are contact fingers that are spread slightly apart (relative to their relaxed state) when they engage the bus bar 43. When the plug-in module is fully engaged one of the contacts 58 is fully engaged with each of the corresponding bus bars 43.

In one embodiment, the plug-in module 20 is installed by a user who grasps the handle 32 and aligns the guide element or elements of the plug-in module 20 with the corresponding guide element(s) of the bus bar assembly 42. Once the corresponding guide elements are initially engaged the user can continue to grip the handle 32 and apply pressure to slide the plug-in module 20 further into the bus bar assembly until the contacts 58 fully engage the corresponding bus bar 43. At this point, the connectors 64 and 68 are also fully engaged. In some embodiments, the latch 33 provides an indication that the plug-in module 20 is fully installed. The preceding process may be reversed (beginning with the unlatching of the latch 33, if included) to remove the plug-in module 20.

A second end (not shown) of the power cable 21 may be connected to an electrical load or further circuitry that is connected to an electrical load either before or after the plug-in module 20 is installed in the bus bar assembly 42. In either instance, the circuit breaker 34 is in the open position, for safety reasons, during the installation of plug-in module 20. Once the plug-in module 20 is installed and the second end of the power cable 21 terminated, the circuit breaker 34 can be closed, for example, to supply power to power cable 21 and the circuitry that is connected to it.

Figure 7:
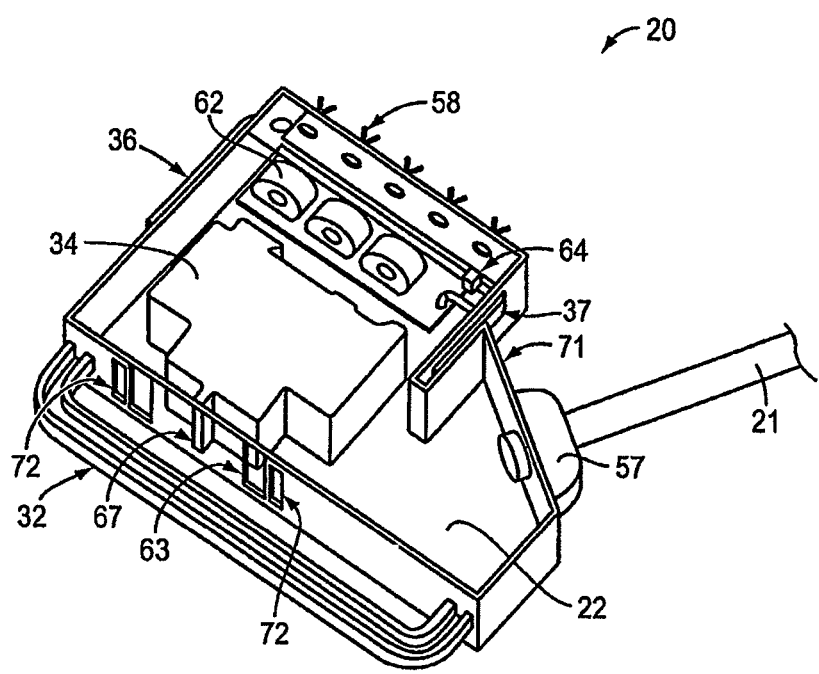
FIG. 7 illustrates a plug-in module in accordance with another embodiment of the invention.

The plug-in module 20 may be provided in a variety of configurations, i.e., the housing 22 need not have a square or rectangular overall shape. FIG. 7 illustrates one such alternate configuration in which the housing 22 includes an additional face 71. According to one embodiment, the power cable 21 enters the housing 22 at the face 71. In a version of this embodiment, the mechanical strain relief 57 is included at the face 71. In some embodiments, the face 71 is positioned at an angle such that the power cable 21 exits the plug-in module 20 at an angle that is not perpendicular to the adjacent side panel 44, 45. As a result, in these embodiments, the power cable 21 may exit the housing 22 at a rearward swept angle that allows the power cable 21 to be more easily routed within the enclosure.

According to one embodiment, the plug-in module 20 includes many of the preceding features described herein including the handle 32, the circuit breaker 34, the guide elements 36, 37, the plurality of contacts 58, the current sensors 62 and the connector 64. According to the illustrated embodiment, the connector 64 is an edge connector. The embodiment illustrated in FIG. 7 also illustrates a circuit breaker operator 67 and a first opening 63 that provides external access to the operator 67 to allow the circuit breaker to be manually opened, closed and/or reset. In addition, the opening 63 may allow operating personnel to determine the status (i.e., open, closed, tripped) of the circuit breaker 34. FIG. 7 also illustrates second openings 72 in the housing that, in one embodiment, allows the re-torquing of mechanical connections within the housing 22 without the need to disassemble the housing 22. According to one embodiment, the second openings 72 align with the terminals/lugs of the circuit breaker 34 to allow the connections of the line conductors to be installed, checked and/or tightened.

The plug-in module 20 may include single pole circuit breakers or multi pole circuit breakers in various embodiments. In some embodiments, the circuit breaker is a three pole circuit breaker while in other embodiments, the circuit breaker is a six pole circuit breaker.

The power cable 21 may also include a variety of embodiments depending upon the load that is being supplied by the plug-in module 20. For example, the plug-in module 20 may supply either a single phase load, multiple single phase loads or three phase load. In addition, the second end of the power cable 21 (i.e., the end that is not pre-terminated) may include a connector.

Figure 8:
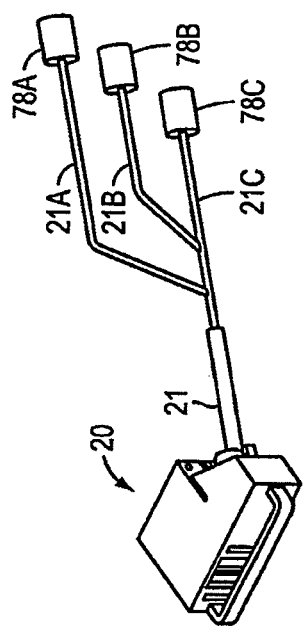
FIG. 8 illustrates a plug-in module in accordance with yet another embodiment of the invention.

FIG. 8 illustrates an embodiment where a plug-in module 20 includes a power cable 21 that is split into a plurality of branch cables 21A, 21B, and 21C. In one embodiment, the plug-in module 20 is a three phase module and the power cable 21 includes conductors for all three phases. Each of the three phases may be split into branch cables 21A, 21B and 21C, one phase per branch cable. In a further embodiment, however, three single pole circuit breakers (e.g., three circuit breakers 34) are included in the plug-in module and the power cable 21 is split into the three branch cables where the first branch cable 21A includes a single phase supplied by one single pole breaker, the second branch cable 21B includes another single phase supplied by another single pole breaker, and the third branch cable 21C includes the remaining single phase supplied by the third single pole breaker. The immediately preceding approach can save space by allowing three separate branch circuits to be supplied via a single plug-in module.

In one embodiment, each of the three branch cables 21A, 21B, 21C includes a connector 78 that can be plugged into an equipment rack. In another version, the power cable includes a three phase connector. Any of a variety of connectors may be employed including NEMA L21-20, L5, L6, L14, and L15 connectors, type CS50 connectors, IEC309 pin and sleeve devices, etc.

The preceding architecture may be employed to supply equipment racks that are adjacent a PDU in which the plug-in module 20 is installed. In one embodiment, the power cable 21 is connected to a three phase equipment rack (i.e., a rack that includes three phase load). In another embodiment, the first branch cable 21A is connected to a first equipment rack, the second branch cable 21B is connected to a second equipment rack, and the third branch cable 21C is connected to a third equipment rack where each of the first, second and third equipment racks are single phase equipment racks (i.e., racks that only require single phase power.)

Further, the power cable 21 may be supplied in fixed lengths that are established when the equipment is ordered, for example, where the dimensions of a plurality of equipment racks with which the plug-in module 20 is employed are known, a pre-determined length may be accurately determined for the power cable 21 that is to connect the plug-in module 20 to equipment in another rack.

Figure 12:
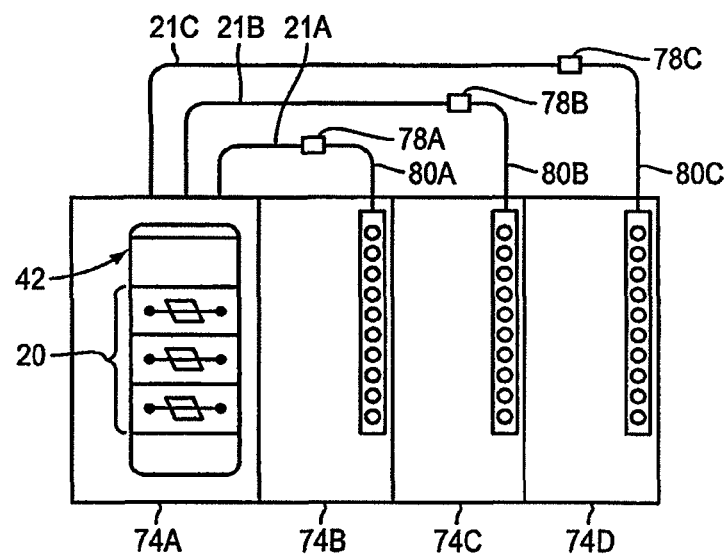
FIG. 12 illustrates a block diagram of a bus bar assembly and plug-in modules in accordance with an embodiment of the invention.

FIG. 12 illustrates an embodiment that employs a plurality of adjacent equipment racks including a first rack 74A which includes a bus bar assembly 42 and plug-in modules 20. One or more additional equipment racks are also included, i.e., a second rack 74B, a third rack 74C and a fourth rack 74D. According to one embodiment, one or more of the racks 74B, 74C and 74D include electrical load that is supplied power via the plug-in module 20. In a further embodiment, the first rack 74A includes a UPS that supplies power to the bus bar assembly 42. As a result, the load supplied via each of the plug-in modules 20 is also supplied power from the UPS.

In accordance with one embodiment, the plug-in modules 20 include pre-terminated power cables 21 which may each include a connector 78. For example, the equipment racks 74B, 74C and 74D may each include single phase load that are connected to the plug-in modules 20 via the cables 21A, 21B and 21C, respectively. Alternatively, or in combination with the preceding, one or more of the cables 21A, 21B and 21C may supply polyphase power (e.g., three phases) to one or more of the equipment racks 74B, 74C and 74D.

Each of connectors 78A, 78B and 78C may connect the power cable 21 to a power cable 80A, 80B, and 80C associated with one of the equipment racks 74B, 74C and 74D, respectively. Thus, in some embodiments, the power cables 80A, 80B and 80C complete the electrical connection between the plug-in modules 20 and the equipment rack that is receiving power from the plug-in modules 20. In addition, the connectors 78A, 78B and 78C may be connected to a corresponding connector (not illustrated) attached to the end of the power cables 80A, 80B and 80C.

FIG. 12 illustrates one example of a power distribution system architecture employing the bus bar assembly 42 and plug-in modules 20, however, various embodiments of the invention support other configurations. Additional equipment, for example, UPS batteries may be included in the equipment rack 74A. In some embodiments, the power cables 21 may be connected to remote equipment racks. Further, the remote equipment racks may include an additional bus bar assembly and plug-in modules. That is, in one embodiment, a plug-in module in a first bus bar assembly may supply power to a second bus bar assembly. In another embodiment, a bus bar assembly and plug-in modules may be located in an equipment rack where all the electrical load that is supplied power by the plug-in modules is located in one or more remote equipment racks. Other combinations of the above configurations and combinations of the above and different configurations may also be employed.

Figure 9:
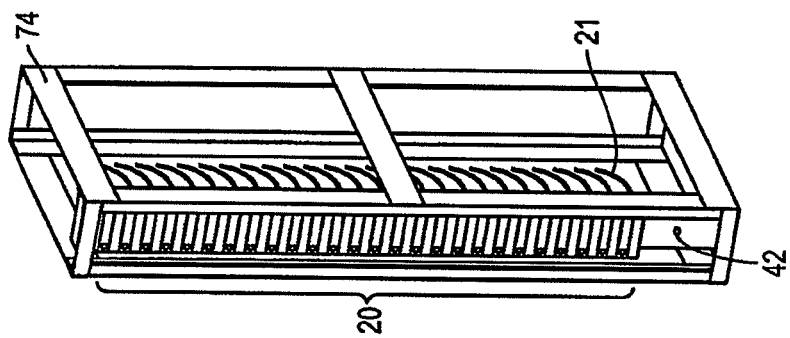
FIG. 9 illustrates a bus bar assembly and plug-in modules in accordance with a further embodiment of the invention.

According to various embodiments, the bus bar assembly 42 may be installed in a variety of configurations and orientations including configurations that provide a high density of available circuits. FIG. 9 illustrates one such embodiment. According to one embodiment, the bus bar assembly 42 is installed in a vertical orientation in a rack 74. In one embodiment, the rack 74 is a standard width rack (e.g., 600 mm wide) while in another embodiment the rack 74 includes a non-standard width, for example, a half rack with a width of 300 mm. In various embodiments, the bus bar assembly 42 is adapted to receive a plurality of plug-in modules 20. In one such embodiment, the bus bar assembly 42 is sized and adapted to receive a quantity of up to 28 3-pole plug-in modules. In addition, where the rack 74 is a half-width rack two bus bar assemblies 42 can be installed adjacent one another in a full size rack to double the quantity of available plug-in modules 20. In some embodiments, the positions (e.g., the positions A-E) are spaced to provide a gap to allow for sufficient air circulation (and heat transfer) to maintain the full load operating temperatures of a plurality of plug-in modules 20 at or below a desired maximum. In one embodiment, the full load rating of the circuit breakers included in the plug-in modules 20 are derated due to the temperature rise expected to occur during operation.

Figure 10:
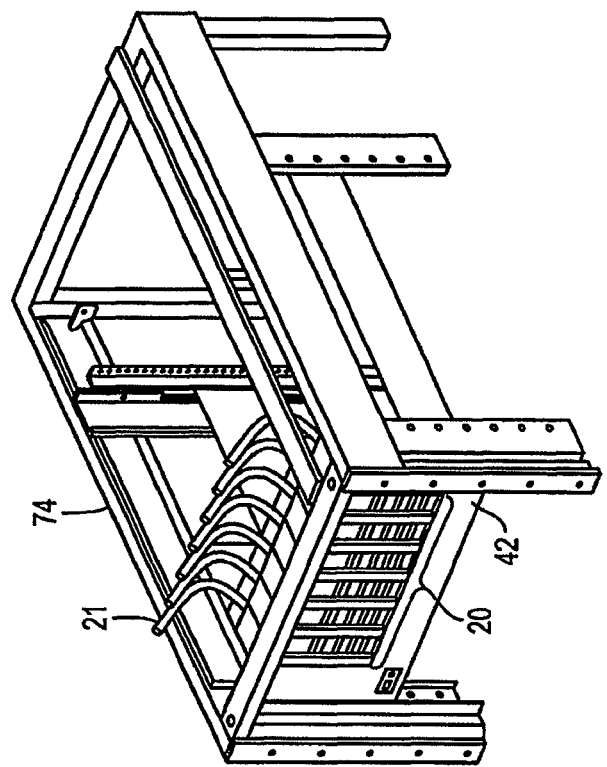
FIG. 10 illustrates a bus bar assembly and plug-in modules in accordance with a still further embodiment of the invention.

Referring now to FIG. 10, a horizontally mounted bus bar assembly 42 is illustrated. Here too, depending upon the configuration, the bus bar assembly 42 may be installed in equipment racks having any of a variety of dimensions. In the illustrated embodiment, the bus bar assembly 42 is sized and adapted to receive a plurality of plug-in modules 20 where the plug-in modules are also oriented in a 90 degree rotation relative to the previously illustrated embodiments. This approach also allows for a high density of output circuits, for example, where a single equipment rack 74 includes a plurality of horizontally mounted bus bar assemblies 42.

Figure 11:
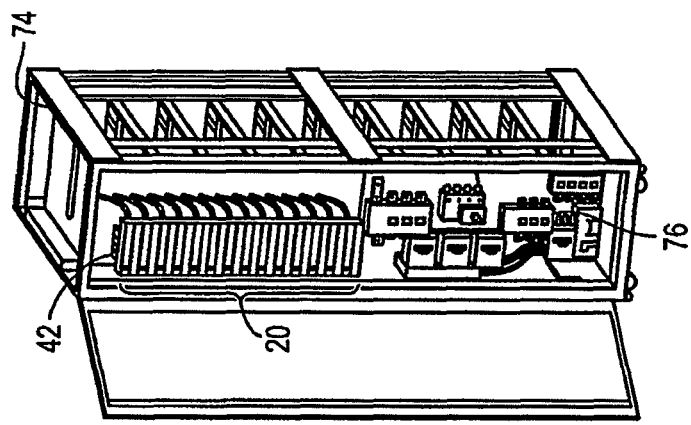
FIG. 11 illustrates a bus bar assembly, plug-in modules and a switching panel in accordance with an embodiment of the invention.

Other equipment may also be included along with the bus bar assembly 42 in an equipment rack. For example, FIG. 11 illustrates one such embodiment in which the bus bar assembly 42 and plurality of plug-in modules 20 are installed in an equipment rack along with a switching panel 76. According to one embodiment, the switching panel 76 includes an input switch, an output switch and a bypass switch associated with a UPS. In one embodiment, the UPS is located in an equipment rack that is adjacent the rack 74. In a further embodiment, modular batteries associated with the UPS are located in an equipment rack located adjacent the rack that includes the UPS on the side opposite the rack 74. In one embodiment, the switching panel 76 includes three subfeed outputs having ampacities ranging from 100 Amps to 160 Amps.

Figure 13:
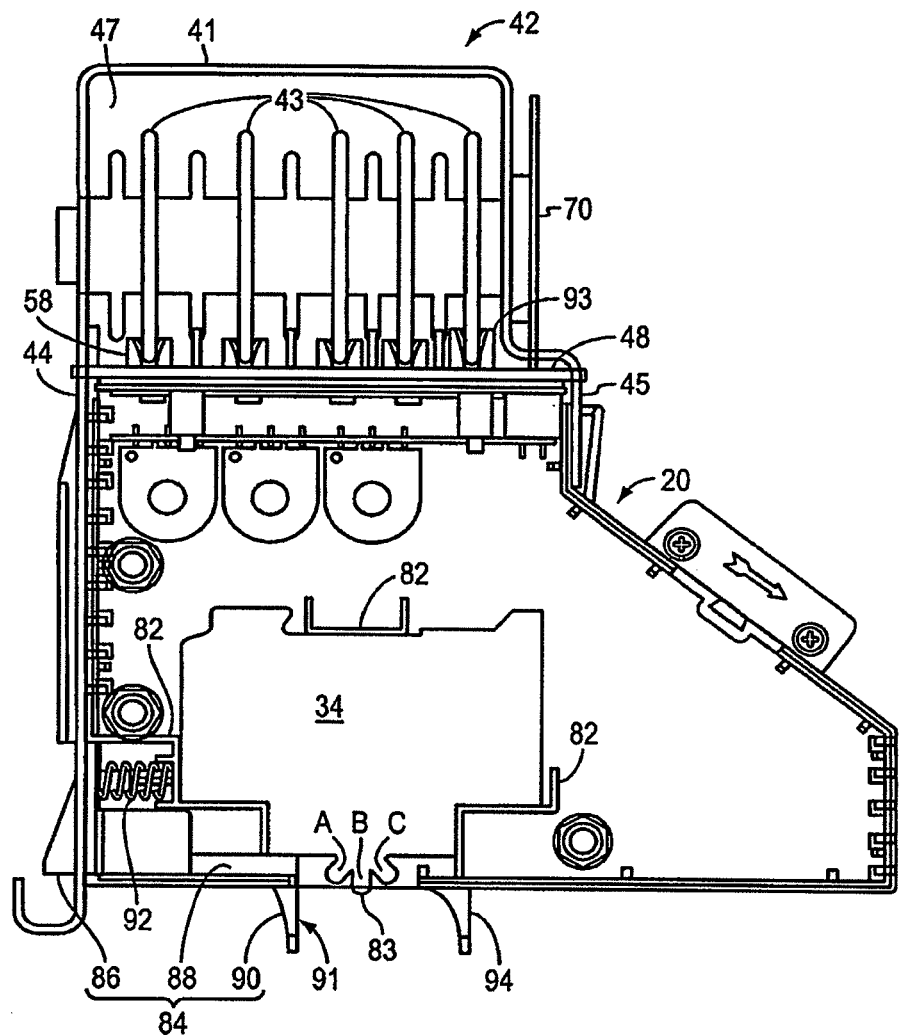
FIG. 13 illustrates a plan view of a plug-in module installed in a bus bar assembly in accordance with an embodiment of the invention.

FIG. 13 illustrates a plan view of a plug-in module 20 in accordance with one embodiment of the invention. In the illustrated embodiment, the top of the housing is removed and, as a result, the components located in the interior of the housing can be seen. The plug-in module 20 includes a circuit breaker 34 with an operator 83 that can be located in at least three operating positions. The operator 83 can be located in a first operating position A where the circuit breaker is in a closed position; a second operating position B where the circuit breaker is tripped; and, a third operating position C where the circuit breaker is in an open position. According to one embodiment, the circuit breaker 34 is retained within an approximately central region of the housing 22 by support structure 82. The support structure may be comprised of one or more molded pieces that are sized and spaced such that they retain the circuit breaker 34 between them when the circuit breaker 34 is located within the housing.

In accordance with one embodiment, the plug-in module 20 also includes an interlock 84 that acts to prevent the plug-in module 20 from being connected to or disconnected from the bus bars 43 when the circuit breaker 34 is closed. In general, the interlock 84 operates by sliding into engagement with the operator 83 to ensure that the circuit breaker 34 is open when the plug-in module is connected or disconnected from the bus bar assembly 42. According to one embodiment, the interlock is comprised of an interference 86, an arm 88, a tab 90 with an engagement surface 91, and a spring 92. When the plug-in module is not installed in a bus bar assembly 42, the spring 92 biases the interlock in a direction away from the operator 83, for example, in a direction parallel to the front panel 24 of the housing.

In accordance with one embodiment, the interference 86 engages with corresponding structure in the bus bar assembly 42 when the plug-in module 20 is either installed or removed from the bus bar assembly 42. For example, when the plug-in module 20 is installed, the interference 86 is engaged by structure in the bus bar assembly (or enclosure), and as a result, the bias provided by the spring 92 is overcome and the arm 88 and tab 90 slide laterally to move the engagement surface 91. The engagement surface 91 contacts the operator 83 and moves the operator 83 to position C (if the circuit breaker is not already open). Then, when the plug-in module 20 is in the fully-installed position (e.g., the plurality of contacts 58 are fully engaged with the bus bars 43), the interference 86 is not engaged by the corresponding structure and the spring 92 biases the arm 88 and tab 90 back to the at rest position in which the engagement surface 91 does not interfere with the operation of the circuit breaker 34. In addition, in accordance with one embodiment, the interlock 84 also acts to open the circuit breaker 34 in a similar fashion upon removal of the plug-in module 20 from the bus bar assembly 42 prior to any of the plurality of contacts disconnecting from any of the corresponding bus bars. That is, upon removal of the plug-in module 20, the engagement surface 91 is biased into engagement with the operator 83 (if the circuit breaker 34 is closed) before the plurality of contacts 58 are disconnected from the bus bars 43.

In various embodiments, the interlock 84 includes structure such as a slide, a lever, an interference including a mechanical contact surface and/or other structure. According to one embodiment, the plug-in module 20 also includes a mechanically-assisted engagement device to assist operating personnel when they install or remove the plug-in module from engagement with the bus bars 43. That is, in one embodiment, it may be beneficial to provide mechanical assistance to slide the plurality of contacts 58 onto each of the corresponding bus bars 43, e.g., to overcome resistance to the spreading apart of the pairs of contact fingers as they engage and slide over the corresponding bus bars. The resistance may, for example, be the result of a dimension by which the contacts of each pair are separated and/or pressure supplied by contact springs. When the plug-in module 20 is installed, the contacts (e.g., the contact fingers) act to grip the bus bars 43. Thus, in one embodiment, the mechanically assisted engagement device may also be employed to assist during the removal of the plug-in module. In accordance with one embodiment, the mechanically assisted engagement device includes a lever and cam configured to provide a mechanical advantage during the installation and the removal of the plug-in module while also providing the above-mentioned interlock, e.g., to open the circuit breaker 34 before it is connected to or disconnected from the bus bars 43.

FIG. 13 also illustrates the structure of a ground contact 93 included among the plurality of contacts 58. In particular, in one embodiment, the ground contact 93 is sized and shaped such that the ground contact 93 of the plug-in module 20 is the first of the plurality of contacts 58 to engage their corresponding bus bar. For example, in one embodiment, the ground contact 93 may be longer than each of the others of the plurality of contacts 58, however, the ground contact may also be oriented differently than others of the plurality of contacts 58. In one embodiment, the ground contact 93 engages a corresponding ground bus bar; therefore, the ground contact 93 illustrated in FIG. 13 provides for a safer operation because a ground circuit is completed prior to any of the line conductors, or neutral conductor engaging a corresponding bus bar.

According to one embodiment, a back panel 41 is included in the bus bar assembly 42. In this embodiment, the first side panel 44, the second side panel 45, the rear panel 48, and the back panel 41 form a region 47 that encloses the bus bars 43. In a version of this embodiment, the first side panel 44, the second side panel 45 and the back panel 41 are constructed of sheet metal and the rear panel 48 is constructed of an electrically insulating material. FIG. 13 also illustrates an embodiment where the printed circuit board 70 is located outside the region 47.

Figure 14:
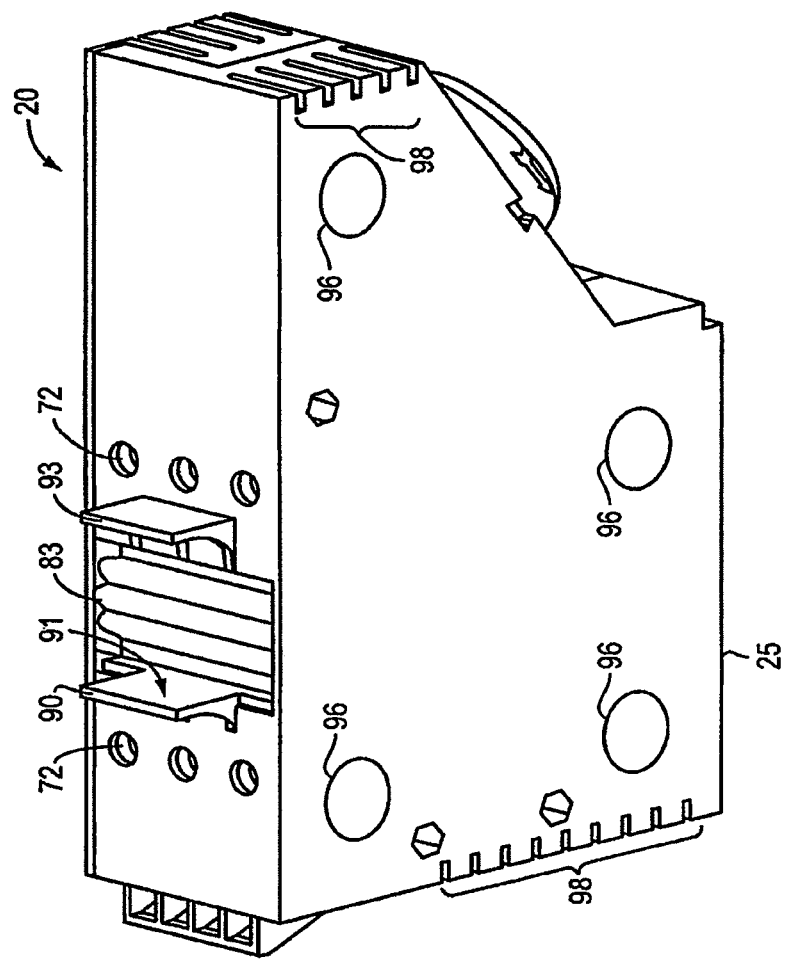
FIG. 14 illustrates an isometric view of a plug-in module in accordance with an embodiment of the invention.

Referring now to FIG. 14, an isometric view from the underside of a plug-in module 20 is illustrated in accordance with one embodiment. FIG. 14 illustrates a bottom panel 25 of the housing, the openings 72, the tab 90 and engagement surface 91, the circuit breaker operator 83 (illustrated in each of 3 possible positions A, B, C), spacers 96 and ventilating ports 98. In accordance with one embodiment, spacers 96 assist in maintaining a desired air gap between adjacent plug-in modules 20, i.e., the spacers 96 are raised areas on the bottom panel 25. According to one embodiment, the top panel of the housing can also include spacers 96. In one embodiment, the ventilating ports 98 are slots provided to allow for air circulation through the housing 11.

FIG. 14 illustrates a fixed tab 93 in accordance with one embodiment. In this embodiment, the tab 90 and the fixed tab 93 are sized and spaced to allow an operator to grasp the fixed tab 93 and move the tab 90 towards the fixed tab 93 to open or reset the circuit breaker. For example, in one embodiment, the tab 90 and the fixed tab 93 are spaced apart such that an operator can squeeze the tab 90 and the fixed tab 93 between a thumb and forefinger to overcome the bias of the spring 92.

In various embodiments, one or more receptacle outlets may be included at the second end of the power cable. A receptacle outlet provides for a direct connection to power utilization equipment such as rack mounted equipment (e.g. switches, routers, hubs, patch panels, servers and server equipment racks/blade server chassis), desktop computers, printers, HVAC equipment, motors, etc. In an embodiment, this direct connection is established by physically mating a receptacle outlet to an attachment plug of the power utilization equipment. As is discussed further below, receptacle outlets may conform to various standards for size, shape, pin-count, voltage, amperage, and phase. Further the receptacle outlets may be configured in a "female" configuration (as illustrated herein) or in a "male" configuration so long as the receptacle outlet is configured to connect to a corresponding connector of the power utilization equipment.

Each of the embodiments described with regard to FIGS. 15-17 below may be installed using a similar technique. In this technique, the plug-in module 20 is connected to the power distribution system and the power cable 21 may be installed by running the cable 21 through an overhead cable management system. Further, the one or more receptacle outlets may be feed into an equipment rack and attached to it or the equipment it houses by using keyhole connectors, magnets, VELCRO® Brand hook and loop fasteners or other fastening hardware. The one or more receptacle outlets may include a flange to facilitate this attachment. Using the plug-in module 20 in this fashion may decrease the rack space required by the power distribution system. Furthermore, providing for factory assembled plug-in modules connected to one or more receptacle outlets may decrease the need for field wiring and thus decrease downtime and/or required hot work.

Figure 15:
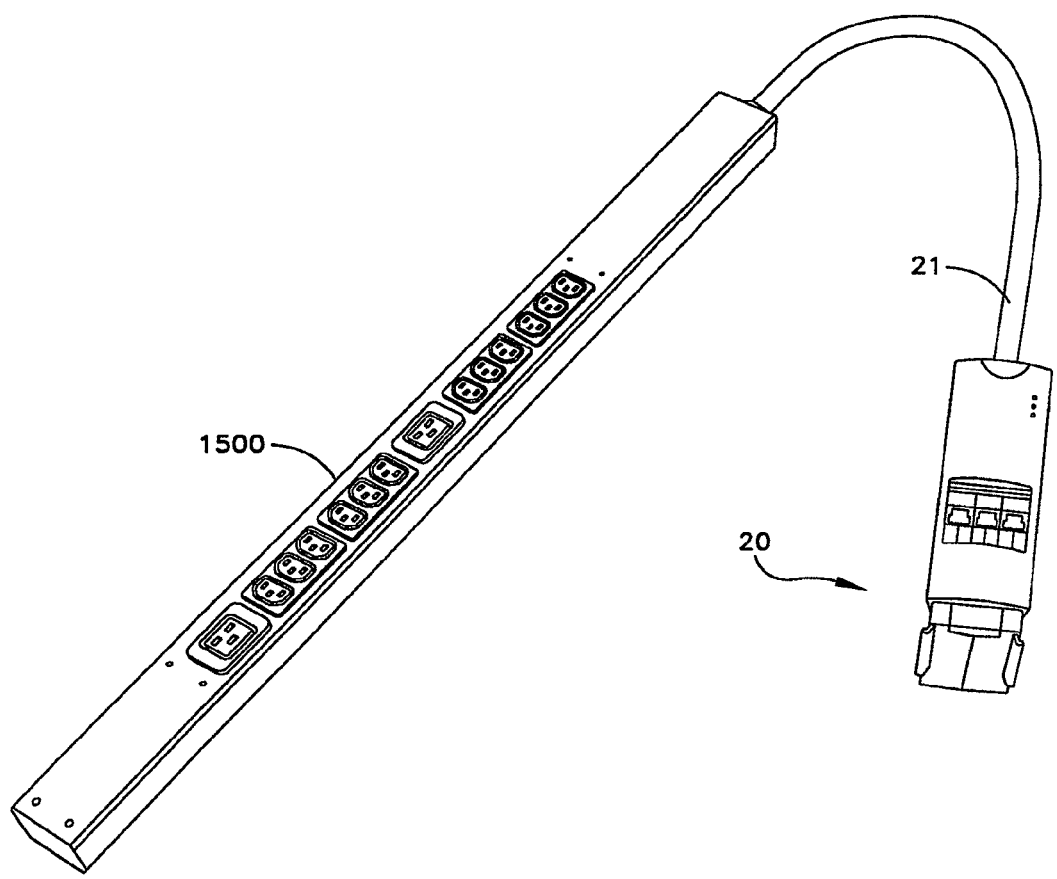
FIG. 15 illustrates a plug-in module in accordance with still another embodiment of the invention.

For example, FIG. 15 illustrates an embodiment where a plug-in module 20 includes a power cable 21 that is connected to a rack mountable power distribution unit ("RMPDU") 1500, e.g. a "power strip" including fastening hardware/structure that allows the power strip to be secured in an equipment rack, which may include multiple receptacle outlets. As can be seen in FIG. 15, the plug-in module 20 connects to the power cable 21 and the power cable 21 connects to the RMPDU 1500. The plug-in module 20, the power cable 21 and the RMPDU 1500 may support single phase or three phase power distribution. The RMPDU 1500 may include one or more outlets.

In various embodiments, power utilization equipment, such as rack mountable equipment, may be plugged directly into the RMPDU 1500. In this example, the RMPDU 1500 may include any receptacle outlet or combination of receptacle outlets including IEC 320 C13, C19 and NEMA L6-20, among other styles and types of IEC and NEMA connectors. The receptacle outlets may have various voltage ratings such as, for example, 120V, 240V and/or 415V and various amperage ratings such as, for example, 12 A, 15 A, 16 A, 24 A and/or 32 A. Further, the receptacle outlets may provide connections configured for a single phase or a multi-phase (e.g. three phase) circuit. Embodiments of the preceding approach to distributing power to rack mounted equipment may result in a reduced number of connections, reduce the space required for the power distribution system and reduce the need for field wiring. In addition, the resulting installation may be completed at a lower cost with a higher degree of safety.

In one embodiment, the RMPDU may include indicia adjacent to the receptacle outlet(s) to indicate the ampacity of the outlet and/or the lines (e.g., phases) of a multi-phase power source that are connected to the outlet. Further, groups of multiple receptacle outlets may be associated with a first common connection L1-L2, while another group of receptacle outlets in the same RMPDU may be associated with a second common connection L2-L3. In one version, indicia associated with each group, respectively, which appears on the RMPDU provides information concerning the line connections.

The RMPDU 1500 may include a display, not shown, that provides information regarding the plug-in module 20. For example, where the plug-in module supports three phase power distribution, the display may provide information regarding the amount of load being supplied by each of the phases, for example, information provided by one or more current sensors. This information can be used, for example, to balance the load across the three phases when connecting power utilization equipment. That is, in one embodiment, a display, e.g., a display integral to the RMPDU, is used to monitor the load on a plurality of phases connected to the RMPDU, as each piece of utilization equipment is connected to the RMPDU. The user may select one of a plurality of receptacle outlets included in the RMPDU to which additional power utilization equipment should be connected based on the loading, e.g. the current draw, of each phase included in the RMPDU. In one embodiment, the user employs the indicia when selecting the receptacle outlet.

In another embodiment, a mobile computing device may provide information concerning the plug-in module 20. For example, scannable identification (such as 1R-scannable identification, e.g., bar code labels, etc.) may be affixed to the plug-in module 20 and/or RMPDU in which the plug-in module is installed (or will be installed). According to one embodiment, the mobile computing device can be used to scan the identification and then, based on the identification information, provide a user of the computing device with the loading of the plug-in module 20 and/or RMPDU on a per-phase basis. In one version, the user can then determine where to connect additional load based on this information. In another version, the mobile computing device may use this information to identify and recommend to the user specific rack and/or receptacle outlet connections that should be used to supply additional power utilization equipment. For example, to maintain a substantially balanced loading, the mobile computing device may use an amount of load being supplied by each phase of the RMPDU to determine the receptacle outlet to which additional power utilization equipment should be connected.

Figure 16:
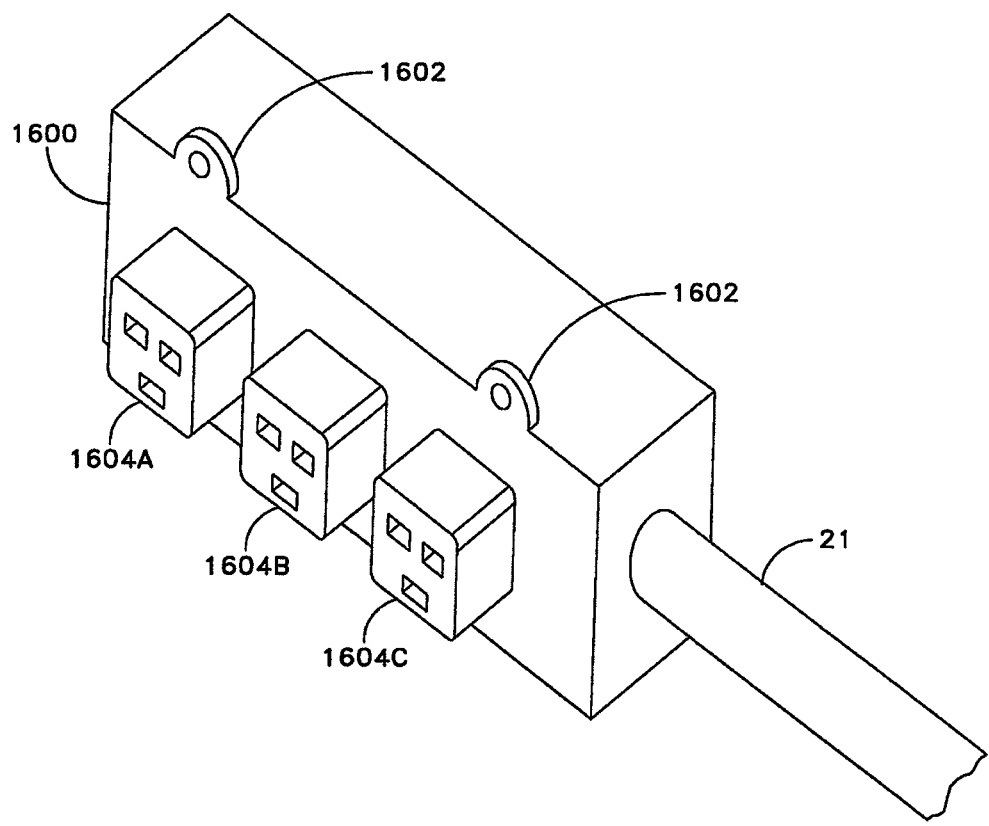
FIG. 16 illustrates a plug-in module in accordance with yet another embodiment of the invention.

FIG. 16 illustrates another embodiment in which the power cable 21 may supply one or multiple receptacle outlets. The depicted embodiment includes a housing 1600 and a plurality of receptacle outlets 1604A, 1604B and 1604C. An end of a power cable 21, is connected to the plurality of receptacle outlets 1604A, 1604B and 1604C within the housing 1600. In accordance with one embodiment, a second end of the power cable is connected to a plug-in module.

In one embodiment, receptacle outlets 1604A, 1604B and 1604C, respectively, are located in separate receptacle outlet cavities (not shown) in the housing 1600. In the illustrated embodiment, the housing 1600 includes flange 1602, which may be used to prevent unwanted movement of the housing after installation, so that a positive electrical connection of the receptacle outlets and corresponding utilization equipment may be maintained. That is, in accordance with one embodiment, a fastener may be inserted through a hole in the flange 1602 and secured to the power utilization equipment, or component thereof.

Further, the embodiment illustrated in FIG. 16 may allow rack space to be conserved. For example, the receptacle outlet cavities may be spaced to align with corresponding attachment plugs of the power utilization equipment. This embodiment may be used to directly connect and supply power to one or more server equipment racks, such as a blade server chassis, via the receptacle outlets 1604A, 1604B, 1604C, i.e. without the need for additional cabling. Thus, in some embodiments, the plug-in module 20 may be coupled to a set of receptacle outlets configured for a specific application. Further, various embodiments, may also provide for an uninterrupted electrical connection from the plug-in module to the power utilization equipment while greatly reducing the amount and complexity of any field wiring. In various embodiments, the housing 1600 encloses the termination and/or connections of the cable 21 to the respective outlet receptacles 1604A, 1604B and 1604C.

Figure 17:
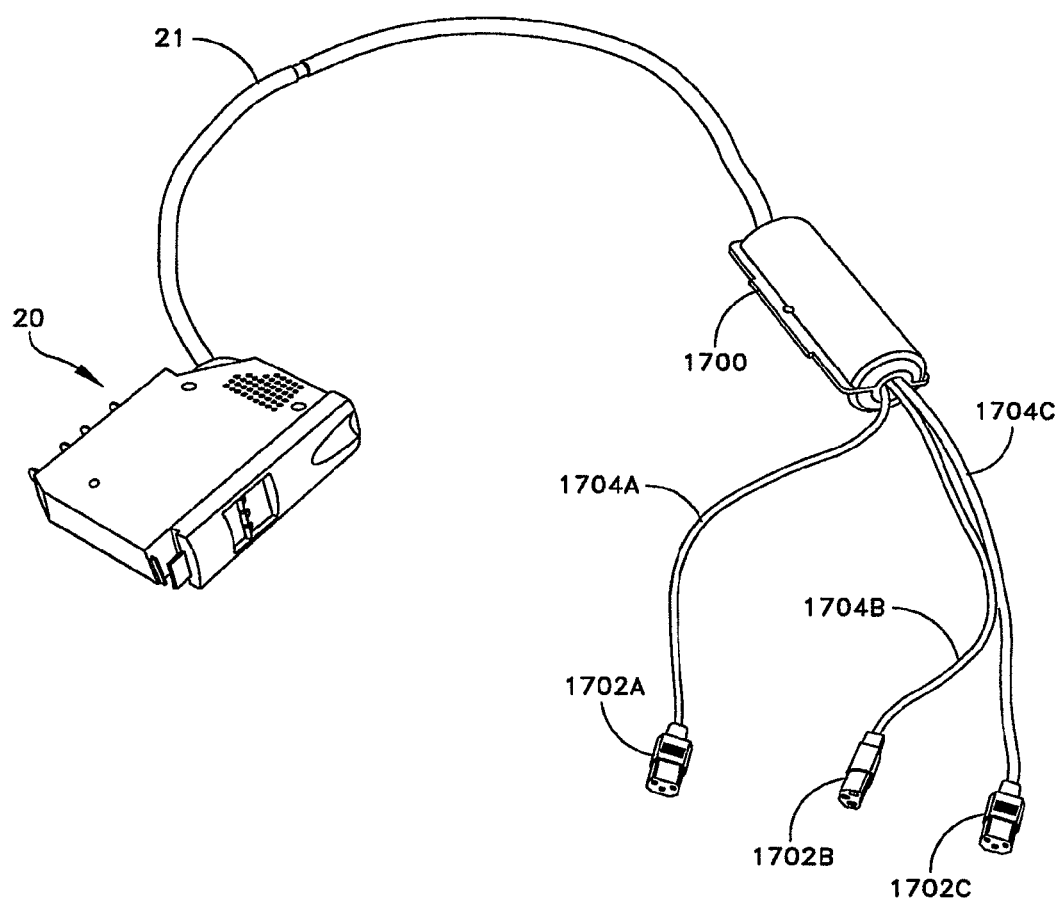
FIG. 17 illustrates a plug-in module in accordance with still another embodiment of the invention.

FIG. 17 illustrates an embodiment where a plug-in module 20 includes a power cable 21, a junction 1700 and separate cables 1704A, 1704B and 1704C each connected to separate receptacle outlets 1702A, 1702B and 1702C, respectively. As shown in FIG. 17, the plug-in module 20 connects to the power cable 21 which includes the junction 1700. In accordance with one embodiment, the junction 1700 is a location of the power cable 21 at which the power cable is split into the separate cables 1704A, 1704B and 1704C, respectively. In the illustrated embodiment, separate receptacles outlets 1702A, 1702B and 1702C are located at the end of the separate cables 1704A, 1704B and 1704C, respectively. Thus, in accordance with one embodiment, the power cable 21 includes a first end connected to an overcurrent protection device, and a second end, a third end, and a fourth end at which the receptacle outlets 1702A, 1702B and 1702C are located, respectively. In various embodiments, the plug-in module 20 illustrated in FIG. 17 may support single phase or multi-phase power distribution.

In a further embodiment, power utilization equipment, including rack mounted equipment, may be plugged directly into the receptacle outlets 1702A, 1702B and 1702C. In this example, the receptacle outlets 1702A, 1702B and 1702C may include any receptacle outlet including IEC 320 C13, C19 and NEMA L6-20, among other IEC and NEMA connectors. The receptacle outlets may have various circuit voltage ratings such as, for example, 120V, 240V and/or 415V and various circuit amperage ratings such as, for example, 12 A, 15 A, 16 A, 24 A and/or 32 A. Further, the receptacle outlets 1702A, 1702B and 1702C may support connections to single phase or multi-phase (e.g. three phase) systems. This embodiment can provide for increased flexibility in supplying power to utilization equipment that may or may not be co-located with one another, e.g., in the same equipment rack. Thus, this embodiment may result in a reduced number of connections, reduce the space required for the power distribution system and reduce the need for field wiring when supplying power to individual pieces of electrical equipment regardless of whether or not the electrical equipment is rack mounted.

In various embodiments, the architecture provided by the bus bar assembly 42 and the plug-in modules 20 allows for a scalable power distribution system that can more easily adapt to changes in the electrical requirements of the facility (e.g., a data center) where it is installed. In particular, the architecture may allow a facility to safely add new output circuits without the need for a power outage.

Further, in accordance with one embodiment, the architecture provides a standardized set of equipment ratings that can be employed in a wide variety of applications. As a result, manufacturers, equipment designers and facility operators can more easily and more economically supply power distribution equipment, design scalable and adaptable power distribution systems, and maintain and expand power distribution systems. That is, a very few "core" elements may be employed to supply power to a wide variety of dynamic electrical loads.

The plug-in module 20 may include any of a variety of switching devices, however, where the plug-in module includes a circuit breaker, the circuit breaker may have any of a wide range of continuous current ratings. This approach provides a system that is highly adaptable. For example, the plug-in module may be standardized for a specific maximum continuous current rating (e.g., 100 Amps). In one embodiment, the standardized continuous current rating is the result of a selection of the plurality of contacts 58 and other conductors integral to the plug-in module, i.e., to provide hardware that is rated for a minimum of 100 Amps. In addition, the sizing of the housing 22 may be selected such that it is sufficient to receive the largest molded case circuit breaker included in the available range of continuous current (e.g., 0-100 Amps). According to one embodiment, the plug-in module is sized and adapted to receive circuit breakers configured for mounting on a DIN rail, for example, circuit breakers with a continuous current rating of from fractions of an Amp to 63 Amps. According to one embodiment, a DIN rail is located within the housing 22 and the circuit breaker 34 is mounted on the rail. In one embodiment, the form factor across the entire range of current ratings is the same.

Various embodiments may integrate features of the plug-in module 20 into a circuit breaker 34 (e.g., into the molded housing of a molded case circuit breaker) such that the circuit breaker 34 can be installed in the bus bar assembly 42 in the manner described herein for a plug-in module 20. For example, a circuit breaker may be equipped with a plurality of contacts 58 and the circuit breaker 34 and circuit breaker housing may include any of or any combination of the guide element 36, the stress relief device 57, the connector 64, the handle 32, the latch 33, the PCB 66, the processor 68, the memory 69 and the interlock 84. In one embodiment, the housing 22 of the plug-in module is eliminated as described here. In one embodiment, the circuit breaker 34 is sized and adapted to be directly installed in the bus bar assembly 42 without a separate housing 22. Alternatively, some of the features described as being in the housing 22 may instead be included in a circuit breaker that is installed in the housing 22 of the plug-in module 20.

The overall electrical ratings of the plug-in module 20 and the bus bar assembly 42 may also be standardized to a very few ratings that each meet of a wide variety of applications. In some embodiments, the standardized hardware is approved by one or more of UL, CSA and VDE. In one embodiment, the standardized hardware includes a first set of plug-in modules 20 and bus bar assemblies 42 rated for 208/120 Volt applications, a second set rated for 415/240 Volt applications and a third set rated for 400/230 Volt applications. In each of the preceding embodiments, the bus bar assembly 42 may include a single standardized continuous current rating of 400 Amps. As mentioned previously, such an approach simplifies the manufacturing, distribution, selection and application of the power distribution equipment.

In various embodiments, the electrical isolation and overcurrent protection may include any one of or any combination of circuit breakers, trip elements, fuses and switchable contacts (e.g., switches).

The apparatus and systems described herein may be employed to provide a scalable and flexible power distribution system for any of a wide variety of facilities including data centers and other commercial and industrial facilities.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A plug-in module for installing in a power distribution assembly, the plug-in module comprising:
   a multi-pole circuit breaker;
   a power cable including:
      a first end coupled to the multi-pole circuit breaker; and
      a second end coupled to the first end;
   at least one receptacle outlet attached to the second end; and electrical contacts coupled to the multi-pole circuit breaker and configured to removably couple the plug-in module to a plurality of stationary electrical conductors of the power distribution assembly.

2. The plug-in module of claim 1, further comprising a rack mountable power distribution unit attached to the second end, wherein the rack mountable power distribution unit includes the at least one receptacle outlet.

3. The plug-in module of claim 2, wherein the rack mountable power distribution unit includes a plurality of receptacle outlets.

4. The plug-in module of claim 3, wherein the rack mountable power distribution unit includes at least a first receptacle outlet having a first current rating and a second receptacle outlet having a second current rating.

5. The plug-in module of claim 3, wherein the plug-in module is configured to couple to a multi-phase power system including at least a first phase conductor, a second phase conductor, and a third phase conductor, and wherein the rack mountable power distribution unit includes at least a first receptacle outlet configured to couple to the first phase conductor and a second receptacle outlet configured to couple to the second phase conductor.

6. The plug-in module of claim 5, wherein the plug-in module is further configured to couple to the third phase conductor, and wherein the first receptacle outlet is configured to couple to the first phase conductor and the third phase conductor, and wherein the second receptacle outlet is configured to couple to the second phase conductor and the third phase conductor.

7. The plug-in module of claim 5, wherein the rack mountable power distribution unit includes a display configured to display a magnitude of current in at least one of the first phase conductor, the second phase conductor, and the third phase conductor.

8. The plug-in module of claim 7, wherein the rack mountable power distribution unit includes at least one current sensor configured to sense a current in at least one of the first phase conductor, the second phase conductor, and the third phase conductor.

9. The plug-in module of claim 2, wherein the rack mountable power distribution unit includes a flange configured to engage a fastener located in an equipment rack.

10. The plug-in module of claim 9, wherein the flange includes a keyhole fastener.

11. The plug-in module of claim 1, wherein the power cable includes a third end coupled to the first end, and wherein the third end includes at least one receptacle outlet.

12. The plug-in module of claim 1, further comprising:
a housing defining at least one receptacle outlet cavity in which the at least one receptacle outlet is located.

13. The plug-in module of claim 12, wherein the housing includes a flange configured to secure the housing to a server equipment rack.

14. The plug-in module of claim 1, further comprising an electrical isolation device.

15. The plug-in module of claim 1, wherein the at least one receptacle outlet includes a receptacle outlet selected from the group consisting of:
an IEC 320 C19 receptacle outlet;
an IEC 320 C13 receptacle outlet; and
a NEMA L6-20 receptacle outlet.

16. The plug-in module of claim 1, wherein the multi-pole circuit breaker is a first multi-pole circuit breaker and the plug-in module includes a second multi-pole circuit breaker,
wherein the at least one receptacle outlet includes a first receptacle outlet coupled to the first multi-pole circuit breaker, and a second receptacle outlet coupled to the second multi-pole circuit breaker,
wherein the first multi-pole circuit breaker provides overcurrent protection for a first circuit including the first receptacle outlet, and
wherein the second multi-pole circuit breaker provides overcurrent protection for a second circuit including the second receptacle outlet.

17. A method of installing a power distribution system in a facility, the method comprising acts of:
obtaining a plurality of plug-in modules, each of the plug-in modules having a multi-pole circuit breaker, a power cable having a first end electrically coupled to the multi-pole circuit breaker, a second end electrically coupled to the first end, at least one receptacle outlet attached to the second end and electrical contacts coupled to the multi-pole circuit breaker; and
installing at least one of the plurality of plug-in modules in a power distribution assembly by sliding at least one plug-in module into the power distribution assembly such that the electrical contacts of the at least one plug-in module are electrically coupled to electrical conductors in the power distribution assembly.

18. The method of claim 17, further comprising coupling the at least one receptacle outlet to an electrical connector of an equipment rack.

19. The method of claim 18, further comprising providing power from the electrical connector to a blade server contained in the equipment rack.

* * * * *